United States Patent [19]
Lammers et al.

[11] Patent Number: 5,211,611
[45] Date of Patent: May 18, 1993

[54] PLANOCENTRIC DRIVE MECHANISM

[75] Inventors: James B. Lammers, Cleves; Frank G. Mirazita, Cincinnati, both of Ohio

[73] Assignee: American Power Equipment Company, Harrison, Ohio

[21] Appl. No.: 585,849

[22] Filed: Sep. 19, 1990

Related U.S. Application Data

[63] Continuation-in-part of Ser. No. 388,533, Aug. 1, 1989, abandoned.

[51] Int. Cl.$^5$ .............................................. F16H 1/32
[52] U.S. Cl. .................................................... 475/178
[58] Field of Search ......................... 475/178; 74/415

[56] References Cited

U.S. PATENT DOCUMENTS

| | | | |
|---|---|---|---|
| Re. 24,288 | 3/1957 | Nanni | 74/63 |
| 1,770,035 | 7/1930 | Heap et al. | 475/159 |
| 2,250,259 | 7/1941 | Foote, Jr. | 475/177 |
| 2,666,345 | 1/1954 | Amberg | 475/165 |
| 2,874,594 | 2/1959 | Sundt | 475/189 |
| 3,056,315 | 10/1962 | Mros | 475/176 |
| 3,073,184 | 1/1963 | Braren | 475/180 |
| 3,144,791 | 8/1964 | Menge, Sr. | 475/180 |
| 3,184,124 | 5/1965 | Beck | 222/333 |
| 3,192,799 | 7/1965 | Pamplin | 475/168 |
| 3,366,066 | 1/1968 | Levey | 417/390 |
| 3,383,931 | 5/1968 | Patterson | 74/63 |
| 3,502,029 | 3/1970 | Halladay | 417/360 |
| 3,574,489 | 4/1971 | Pierrat | 418/61.3 |
| 3,779,669 | 12/1973 | Sommer | 417/214 |
| 3,783,712 | 1/1974 | Colinet | 475/168 |
| 3,787,149 | 1/1974 | Dane | 417/554 |
| 3,827,339 | 8/1974 | Rosen | 92/152 |
| 3,893,627 | 7/1975 | Siczek | 239/332 |
| 3,985,047 | 10/1976 | Therkelsen | 254/354 |
| 3,998,112 | 12/1976 | Pierrat | 475/168 |
| 4,009,971 | 3/1977 | Krohn et al. | 417/93 |
| 4,023,440 | 5/1977 | Kennington | 475/159 |
| 4,052,928 | 10/1977 | Pierrat et al. | 409/38 |
| 4,117,746 | 10/1978 | Pierrat | 475/168 |
| 4,271,726 | 6/1981 | Ryffel | 418/613 |
| 4,282,777 | 8/1981 | Ryffel et al. | 475/159 |
| 4,549,450 | 10/1985 | Pierrat | 475/168 |
| 4,594,915 | 6/1986 | Braren | 475/178 X |
| 4,621,543 | 11/1986 | Gabilondo | 475/178 X |
| 4,685,517 | 8/1987 | Baggett | 166/105 |
| 4,775,303 | 10/1988 | Liska | 417/554 |
| 4,804,109 | 2/1989 | Vanderjagt | 222/38 |

OTHER PUBLICATIONS

Gears, by H. E. Merritt pp. 267 and 268, third edition, 1954.

*Primary Examiner*—Leslie A. Braun
*Assistant Examiner*—Daniel Wittels
*Attorney, Agent, or Firm*—Frost & Jacobs

[57] ABSTRACT

A planocentric drive mechanism is disclosed which includes a plurality of longitudinally extending pins arranged in a circle about an axis of rotation, a rotating shaft which carries an eccentric cam, and a pinion gear which is rotatably carried by the eccentric cam. The pinion gear has a plurality of apertures formed therethrough, within which the pins are disposed, thereby limiting the pinion gear to oscillation. An output shaft is aligned with and rotatably about the axis of rotation, and includes a plurality of second pins which mesh with cycloidal teeth disposed about the periphery of the pinion gear.

2 Claims, 16 Drawing Sheets

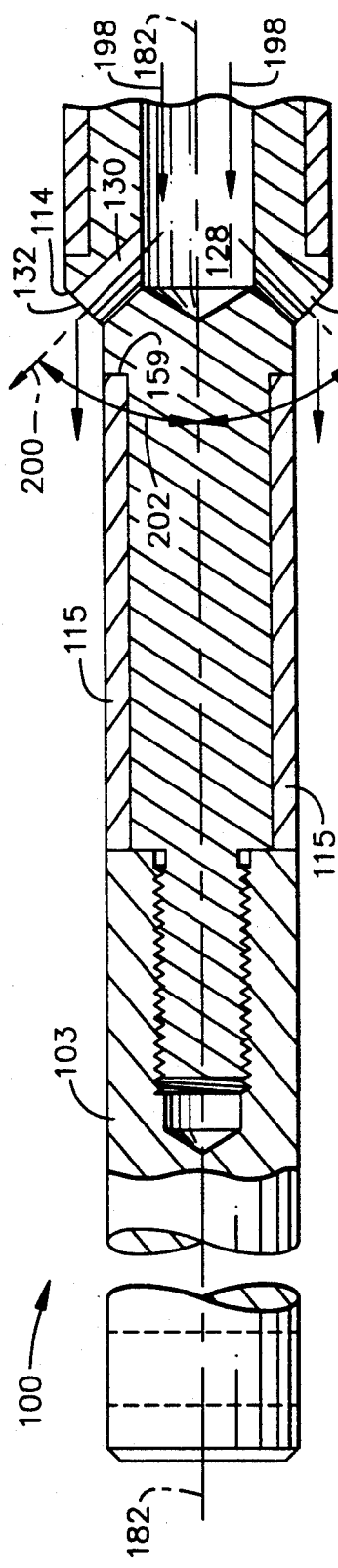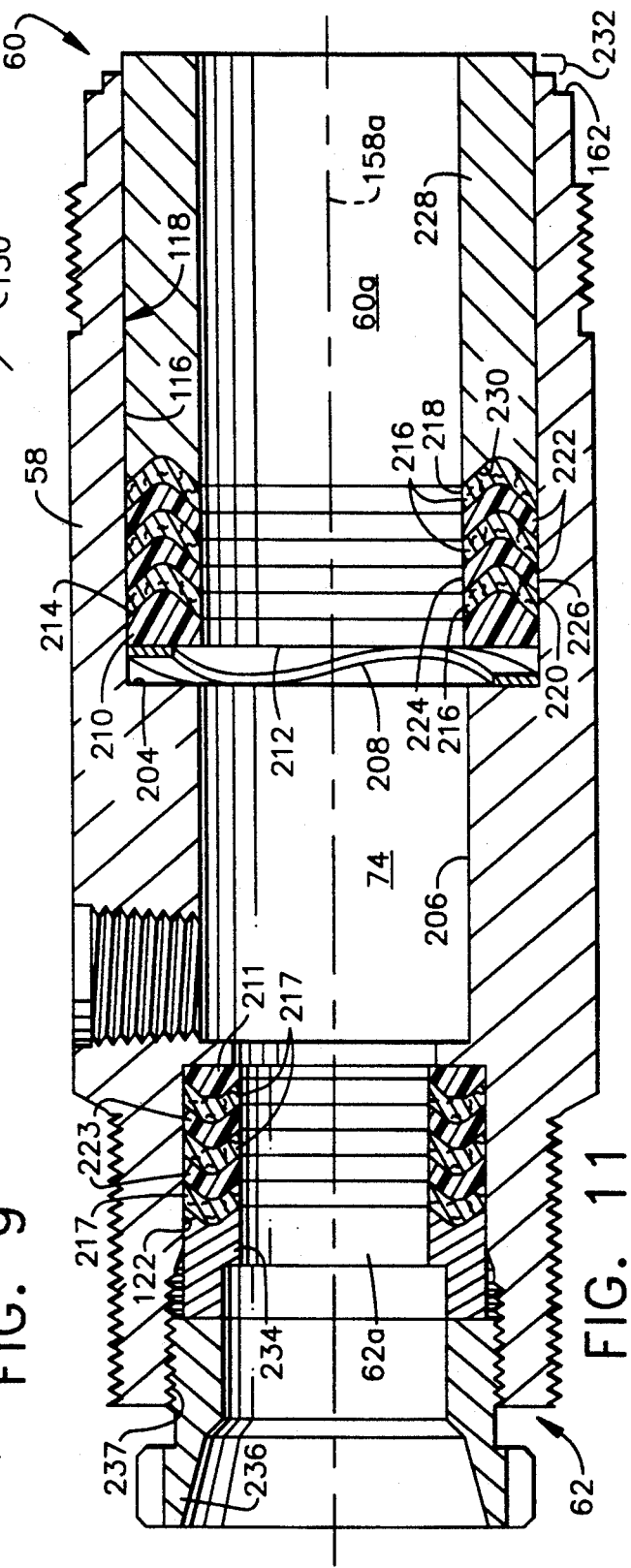
FIG. 9
FIG. 11

PLANOCENTRIC DRIVE MECHANISM

This is a continuation-in-part application of U.S. Ser. No. 07/388,533, filed Aug. 1, 1989, abandoned.

TECHNICAL FIELD

The present invention relates generally to fluid pump assemblies, and is particularly directed to a fluid pump assembly which utilizes a source of rotational power which is translated to reciprocating motion to drive a double-acting piston fluid pump. The invention will be specifically disclosed in connection with a fluid pump which includes a two piece piston with replaceable wear sleeves, angularly oriented fluid outlet passages disposed through the piston, independently and externally adjustable upper and lower packing glands, non-lapped/non-brazed convex reversible valve seats, a open side scotch yoke mechanism including means for reducing the side forces generated therein, and a planocentric drive speed reducer used in combination with a source of rotary power.

BACKGROUND OF THE INVENTION

Apparatuses for the airless spraying of paint and other fluids are well known. Airless paint sprayers are advantageous over compressed air sprayers because they are able to apply the paint at a significantly faster rate than air sprayers. They are particularly well suited for commercial, interior and exterior uses. They do not produce as fine a finish as air sprayers, so they are usable where a moderate finish is acceptable.

A typical airless paint spraying apparatus includes a fluid pump which delivers pressurized paint to a spray gun. The spray gun includes a nozzle particularly adapted for the corresponding fluid and pressures. Paint is supplied to the pump through an inlet tube, which may include a suction screen, that is placed directly into a paint can. The paint can typically used ranges in size from a five gallon can up to a fifty-five gallon can, depending upon the particular application. Paint is pumped from the can and through a flexible hose to the spray gun from which it is sprayed on the surface being painted.

The present invention is directed to a fluid paint pump assembly which includes a reciprocating pump. Many different sources of reciprocating motion to drive the pump are known in the art. One method is to use a hydraulic pump which powers a reciprocating hydraulic motor. Through a series of internal valves, the hydraulic motor reciprocates between two positions while the hydraulic fluid continuously flows in one direction. The reciprocating output of such a hydraulic motor is connected to a piston of the reciprocating fluid pump. The hydraulic pump may be driven by a wide range of rotational power sources, such as electric or gasoline engines.

The use of reciprocating hydraulic motors has some inherent disadvantages associated with it. First, there are the accompanying parasitic losses inherent in the hydraulic transfer of power and motion. Second, there is a practical limit to the cycle time of a reciprocating hydraulic motor. Additionally, there is an associated degree of complexity due to the need to supply a hydraulic fluid reservoir and filter.

As is also well known in the industry, a reciprocating fluid pump may be directly driven by a rotational power source through the use of a mechanism which translates rotational power and motion into reciprocating power and motion through the use of various mechanical mechanisms. However, many motion translators known in the prior art also translate some of the motion into side loading of the piston. The side forces can cause premature wear and failure of the seals or piston.

Depending on the specific rotational power source, a speed reducer may need to be located between the power source and the motion translator. One method of speed reduction is the use of gear sets and offset shafts. Another method is the use of planetary gear sets which include planet carriers which carry and locate planet gears between a ring gear and a sun gear. In either case, in order to obtain the necessary speed reduction, which may range as high 20:1 and beyond, such speed reducers can be expensive to manufacture and assemble, as well as bulky and noisy. All of these problems are objectional to the manufacturer as well as the end user.

The fluid pump is also well known in the industry. It consists of a reciprocating piston and packing glands which create a series of variable volume fluid chambers. As the piston is reciprocated between two positions, fluid is drawn into the pump through an intake siphon tube and past a one way check valve. When the piston reverses direction, the check valve closes and fluid is forced out the pump outlet through a hose to a spray gun. The piston itself typically carries a second check valve which provides the valving necessary to create the flow through the pump.

With a double acting pump, fluid is pumped out of the outlet, independently of the direction of travel of the piston. However, fluid is only drawn into the pump inlet during one-half of the cycle of the piston.

In such prior art pistons, a fluid passage way may be formed internally about the axis of reciprocation of the piston. At one end, the piston opens to a fluid pump chamber which directly communicates with the fluid inlet. Intermediate the ends of the piston, a hole is cross drilled, perpendicular to the axis of reciprocation of the piston, which communicates with the opposite end of the internal chamber of the piston and a second fluid pump chamber. Usually a plurality of such holes are so drilled. This forms outlet passages and exits whereby the fluid flows along the axis of reciprocation of the piston and exits the internal cavity at a right angle thereto. Because of the geometry of the pump, this flow through the internal cavity of the piston occurs during only one-half of the cycle of the piston.

Several problems are experienced with such prior art fluid pumps. First, as will be described later, the cross drilled outlet passages and exits decrease the efficiency of the fluid pump, in part due to the right angle change in direction induced in the flow of fluid. Such right angle outlet passages and exits also add length to the piston itself. Usually the piston, as well as the pump housing are formed of a stainless steel material. Such additional length adds to the cost of manufacture, as well as the cost of replacement parts for the pump.

Another problem with such prior art fluid pumps, is the inaccessibility of the packing glands which separate the fluid chambers from each other, as well as from the ambient environment. Efficient operation of such fluid pumps requires that optimum sealing be provided by the packing glands. Optimum sealing is a balance between adequate sealing force and excessive drag (resulting in wear, friction, heat generation and power consumption). Typical prior art pumps do not provide any means for externally individually compensating for aging and wearing of the individual packing gland, independent of the other packing gland.

Additionally, it is known in the art to have one of the packing glands carried by the piston. This results in one of the packing glands having relative motion with respect to one section of the piston, while the other packing gland has relative motion with respect to the housing. Such a design causes wear on both the piston and the housing. This necessitates the costly replacement of both the piston and the housing when the packing glands wear these components beyond their service limit.

As mentioned above, two one-way check valves are disposed within the fluid pump. These check valves provide the proper valving necessary to pump fluid from the inlet to the outlet. During each full cycle stroke of the piston, each check valve will be opened for approximately one-half of the cycle and closed for the remaining half of the cycle. Frequently these check valves are comprised of steel balls and valve seats. The ball comes into sealing engagement with its respective valve seat when the pressure downstream of the valve is greater than the pressure upstream of the valve. Paint is a relatively abrasive fluid, which causes wear on the valve seats. The cyclical seating and unseating of the ball also tends to wear the valve seat. In order to obtain acceptable life out of the valve seat, they may be formed of a very hard material, such as tungsten carbide. Because of the expense of such materials, the seats may be designed with two sealing surfaces. Prior art designs however, require that the valve seats be relatively large, which results in a greater total volumetric use of these expensive materials.

The prior art valve seats are typically designed with flat or squared off sealing surfaces. In order to allow fluid to flow through the check valve, the ball must be displaced a sufficient distance from the seat so as to allow adequate flow. This distance must also be sufficiently small so as to provide for a quick return of the ball to the seat to prevent reverse flow when the direction of reciprocation changes. The sharp edged seats result in turbulent flow between the seat and the check valve. This can result in the build up of paint deposits on the seat, thereby decreasing the sealing effect.

SUMMARY OF THE INVENTION

Accordingly, it is a primary object of the present invention to provide a fluid pump which has improved efficiencies and cost performance by orienting outlet passages and exits formed in the piston at an acute angle to the axis of reciprocation.

It is an object of the present invention to provide a fluid pump which incorporates a two piece piston with replaceable wear sleeves.

It is another object of the present invention to provide a fluid pump which permits resiliently biased packing glands to be externally adjusted independently of each other.

It is yet another object of the present invention to provide a fluid pump which maximizes the useable life of the internal valve seats, while minimizing the amount of material required to manufacture such valve seats.

It is another object of the present invention to provide a fluid pump with valve seats which allow laminar flow through the valve and do not produce paint build up.

It is a further object of the present invention to provide a fluid pump which reduces the losses accompanying the flow of fluid into and through the intake siphon tube.

It is another object of the present invention to provide a fluid pump assembly which is carried by a cart with extendable, telescoping handles which, in the extended position, are secure and stable.

It is yet another object of the present invention to provide an improved speed reduction transmission for delivering power to the fluid pump.

Yet another object of the present invention is to provide a fluid pump assembly driven by a rotational power source which minimizes the transfer of side forces to the piston.

A still further object of the present invention is to provide a fluid pump assembly which has a relatively high reduction ratio between the source of rotary power and the motion translator, while minimizing the complexity, as well as the axial length, of the overall assembly.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fluid pump is provided which includes a housing having a fluid inlet, a central cavity in fluid communication with the inlet, and an outlet in fluid communication with the central cavity. A piston is disposed at least partially in the central cavity, the piston including first and second portions. A first wear sleeve is disposed about the first portion of the piston, and a second wear sleeve is disposed about the second portion of the piston. First sealing means are included for sealing between the housing and the first wear sleeve. Second sealing means are included for sealing between the housing and the second wear sleeve.

In accordance to a further aspect of the invention, there is provided means for separating the central cavity into a variable volume first chamber and a variable volume second chamber, with the piston being movable between a first and second position so as to vary the volumes of the first chamber and the second chamber in an inverse relation therebetween.

According to a further aspect of the invention, a separating means includes the first wear sleeve having a larger outside diameter than the outside diameter of the second wear sleeve. And yet another aspect of the present invention, the first sealing means is disposed between the first chamber and the second chamber, and the second sealing means is disposed between the second chamber and the ambient environment.

In a still further aspect of the invention, at least one of the first portion and the second portion includes an annular step which defines one end of the respective portion. The respective wear sleeve disposed thereabout has a thickness which is approximately equal to the radial width of the annular step.

According to a still further aspect of the present invention, a second piston is connected to the second portion of the first piston at one end, and includes means for preventing the removable of the second wear sleeve from the second portion while the second piston is connected to the first piston. And yet another aspect of the present invention, the outside diameter of the second piston is larger than the inside diameter of the second wear sleeve.

In a still further aspect of the present invention, means connected to the piston are provided for preventing the removable of the first wear sleeve while the means is connected to the piston.

According to another aspect of the invention, at least one of the first sealing means and the second sealing means comprise a packing chamber, a first packing adaptor disposed in the packing chamber, a plurality of v-shaped packing rings disposed in the packing chamber in stacked alignment with each other, and a second packing adaptor disposed at least partially in the packing chamber.

In yet another aspect of the present invention, an annular spring is disposed in the packing chamber intermediate the base and the first packing adaptor.

In a still further aspect of the invention, a fluid pump is provided which includes a piston having a wear sleeve disposed thereabout.

In accordance with another aspect of the present invention, reversible valve seats are provided in the fluid pump which incorporate concave sealing surfaces.

In yet another aspect of the invention, a fluid pump assembly is provided which includes a reciprocating fluid pump, a source of rotary power and a scotch yoke mechanism which is connected to the piston and connectable to the source of rotary power. The scotch yoke mechanism includes an eccentric crank and a yoke. The yoke includes first and second surfaces which are disposed substantially perpendicular to the axis of reciprocation of the piston in a spaced apart relation from each other to define an open side recess. The crank is disposed at least partially in the recess.

In a still further aspect of the present invention, means are provided for reducing side forces on the piston which are generated by the operation of the scotch yoke mechanism.

According to another aspect of the invention, a guide post extends from one side of the yoke in the direction opposite of the piston. Means are provided for bearingly supporting the guide posts and the piston.

In accordance to a further aspect of the present invention, a planocentric drive mechanism is provided which includes a rotating shaft, a plurality of pins equally spaced about a circle which is centered about the axis of rotation of the rotating shaft. The pins are stationary with respect to the rotating shaft and spaced radially apart therefrom. An eccentric cam is carried by the rotating shaft, with a pinion gear being rotatably carried by the eccentric cam. The pinion gear includes a plurality of apertures formed through the pinion gear, with one of the first pins disposed partially in each aperture. The pinion gear also includes a plurality of cycloidal teeth which intermesh with second pins which are disposed about a circle and carried by an output shaft.

According to yet a further aspect of the present invention, the planocentric drive mechanism includes a scotch yoke mechanism for converting the rotary power to reciprocating power.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description served to explain the principals of the invention. In the drawings:

FIG. 9 is a fragmentary, diagrammatic partial cross sectional view of the piston, showing the internal cavity, outlet passages and exits, and the angle formed by the flow of fluid with respect to the axis of reciprocation.

FIG. 11 is a cross sectional view of the fluid pump cylinder showing the upper and lower packing glands.

Reference will now be made in detail to the present preferred embodiment of the invention, an example of which is illustrated in the accompanying drawings.

DETAILED DESCRIPTION OF THE PREFERRED EMBODIMENT

Figure 1:
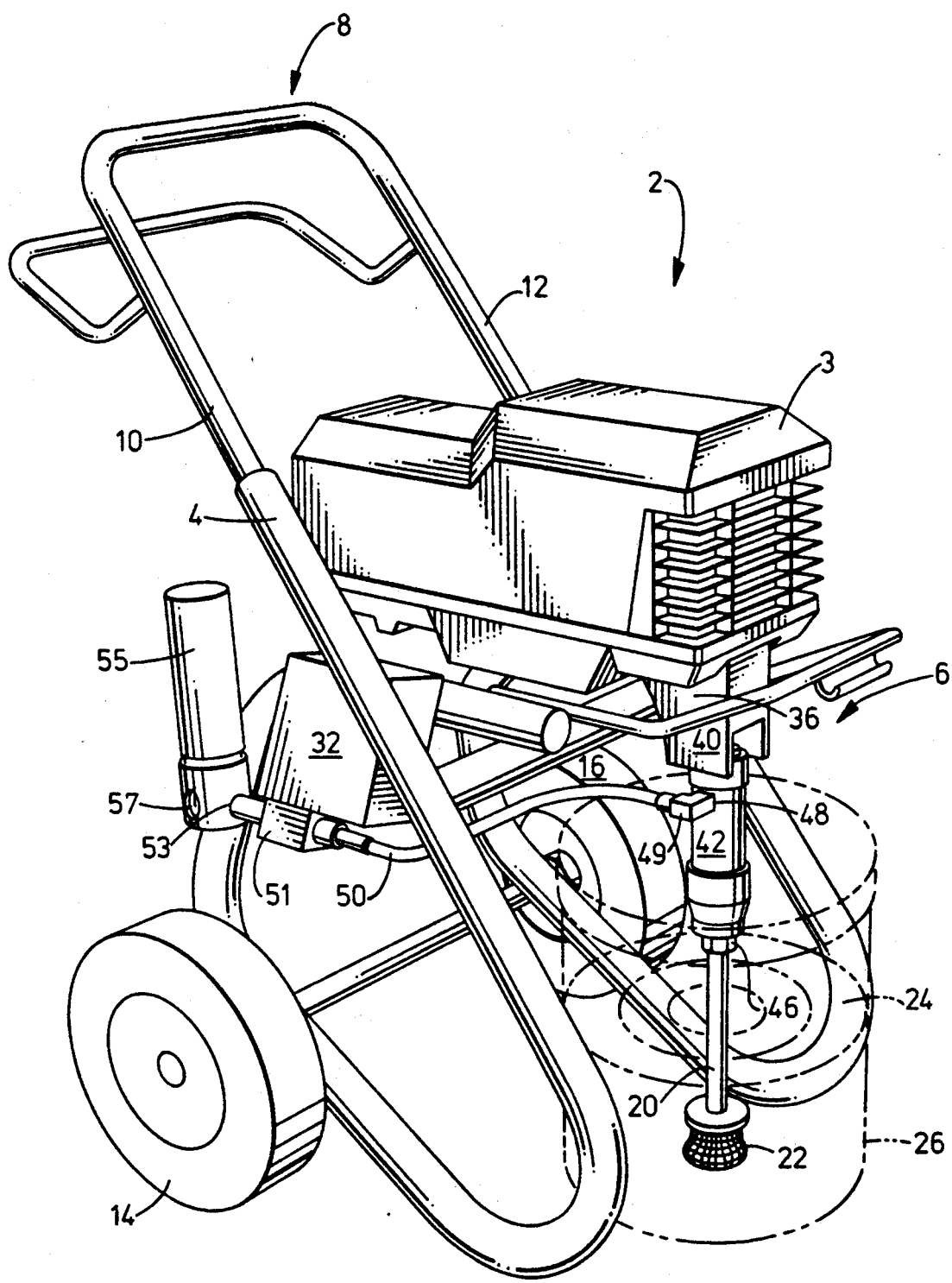
FIG. 1 is a perspective view of a fluid pump assembly in accordance with the present invention.

Referring now to the drawings, FIG. 1 shows an airless paint spraying apparatus generally designated by the numeral 2 constructed in accordance with the present invention. Apparatus 2 includes cart 4 which supports the fluid pump assembly, generally designed by the numeral 6. Stand 4 includes telescoping handle 8 which includes two extendable legs 10 and 12. Disposed on either side of cart 4 are wheels 14 and 16. In use, apparatus 2 may be wheeled to a particular location by pivoting apparatus 2 about wheels 14 and 16 by using handle 8. Apparatus 2 may then be rolled to the necessary location and placed so that suction tube 20 and associated suction screen 22 is immersed below fluid level 24 of container 26, both shown as dotted lines.

Figure 13:
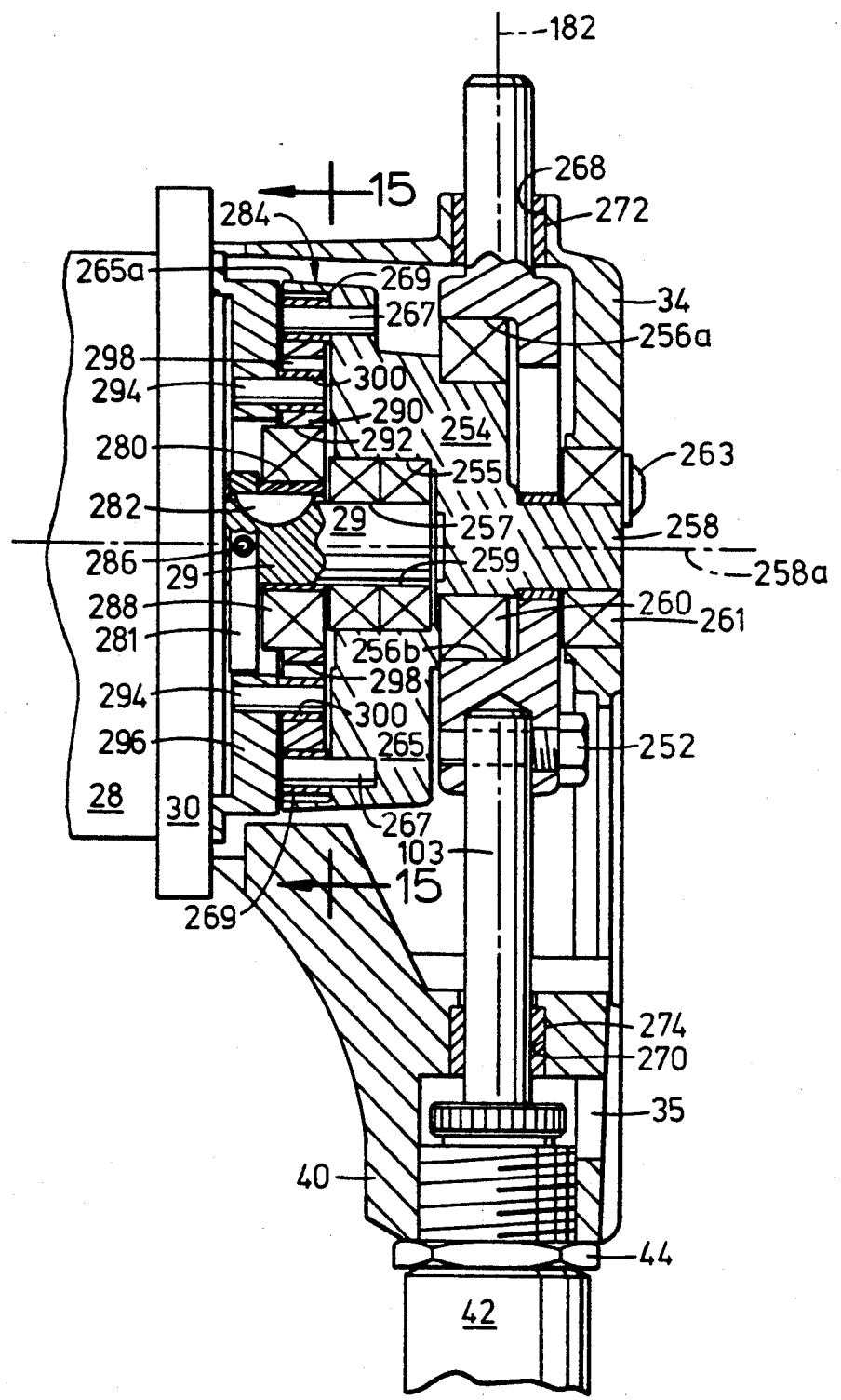
FIG. 13 is a side cross sectional view of the planocentric drive mechanism and the scotch yoke mechanism.

Fluid pump assembly 6 includes polypropolene protective cover 3 which houses electric motor 28 (FIG. 13) which has end bell 30 (FIG. 13). Electric motor 28 may be AC or DC, and may be operated by electronic control 32 mounted to the stand 4 as shown, or mounted otherwise as convenient for production.

Extending below protective cover 3 is transmission housing 34 with fluid pump support 40 formed integral therewith. Reciprocating fluid pump 42 is connected to fluid pump support 40 by internal threads (not shown) formed therein which mesh with external threads (not shown) formed in the end of fluid pump 42.

Suction tube 20 is threaded into engagement with fluid pump inlet 46 by internal threads (not shown) disposed in fluid pump 42 adjacent fluid pump inlet 46. Fluid pump outlet 48 is shown with nipple 49 extending from the wall of fluid pump 42. Flexible hose 50 is connected to nipple 49 at one end and to a pressure transducer 51 at the other end. Pressure transducer 51 is connected to inlet 53 of filter 55. Outlet 57 is shown as a threaded hole to which a hose attached to a paint spray gun (not shown) may be attached.

In use, fluid is pumped from container 26 through suction tube 20 into fluid pump inlet 46 (best seen in FIG. 2). Fluid flows through pump 42, due to the reciprocating motion of the piston (shown and described below). Fluid flows out of fluid pump 42 through fluid pump outlet 48, through flexible hose 50, into filter 55 and out outlet 57 to the spray gun or similar device.

Figure 2A:
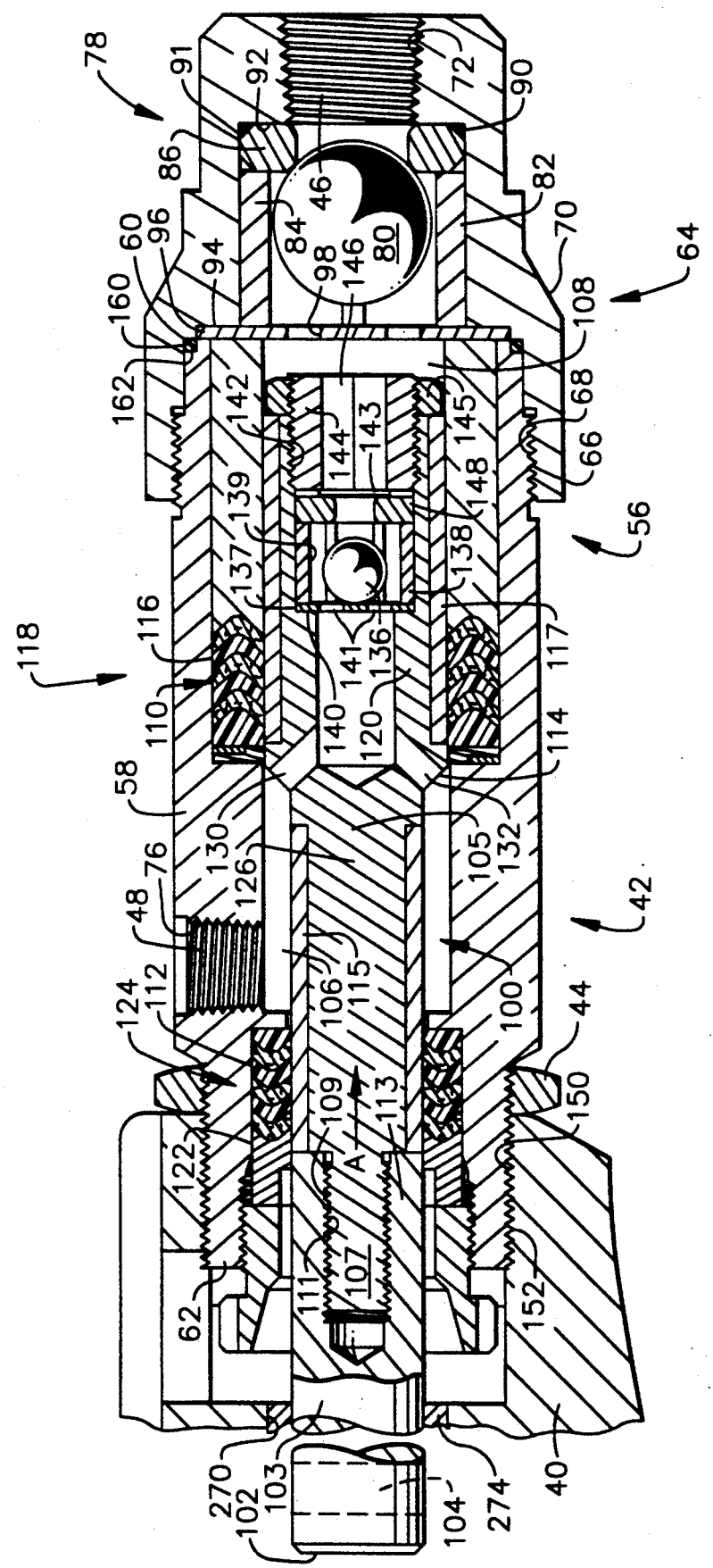
FIGS. 2A, 2B, 2C and 2 are cross sectional views of the fluid pump, and a fragmentary portion of the transmission housing, showing the reciprocating piston in various positions.

Referring now to FIG. 2A there is shown a preferred embodiment of fluid pump 42 in cross section. Fluid pump 42 has a housing 56 which includes cylinder portion 58 which has first end 60 and second end 62. Housing 56 also includes detachable foot valve assembly 64 which is threaded onto cylinder portion 58 by the intermeshing of external threads 66 formed on cylinder 58 at end 60, and internal threads 68 formed in foot valve assembly housing 70.

Housing 56 includes fluid inlet 46 which is formed in foot valve assembly housing 70. Internal walls 72 of fluid inlet 46 are threaded with standard pipe threads or the like, adapted to be connected to suction tube 20 (shown in FIG. 1). Alternatively, a flexible hose (not shown) may be attached to fluid pump inlet 46 in a similar manner. The opposite end of the hose may then be placed in the source of fluid to be pumped.

Central cavity 74 (shown more clearly in FIG. 11) is formed internally in cylinder 58. Central cavity 74 terminates at either end 60 and 62 of the cylinder 58 in openings 60A and 62A (shown more clearly in FIG. 11).

Fluid outlet 48 is formed as a threaded bore through cylinder 58, in fluid communication with central cavity 74 on the interior, and with the ambient environment external to fluid pump 42. Nipple 49 (FIG. 1) may be threaded into engagement with internal threads 76 for connection to flexible hose 50 (FIG. 1).

Central cavity 74 is also in fluid communication with fluid inlet 46, through first check valve 78, which is carried by foot valve housing 70. First check valve 78 is also known as the foot valve. As shown in FIG. 2A, foot valve 78 includes ball 80 which is surrounded and guided by ball guide 82 which is piloted in foot valve bore 84 formed in foot valve assembly housing 70. Foot valve seat 86 is piloted in foot valve bore 84. O-Ring seal 90, made of Viton ® or similar solvent resistant material, is disposed adjacent bottom 92 of bore 84 in the space created by chamfer 91 formed about the circumference of foot valve seat 86, and seals between foot valve housing 70 and foot valve seat 86.

Step 94 is formed at the opening of bore 84 which has a larger diameter than bore 84. Step 94 is configured to hold ball stop disc 96.

Ball stop disc 96 has a plurality of openings 98 which allow fluid to flow through ball stop disc 96 while stopping ball 80 from traveling out of ball guide 82. When foot valve 64 is threaded onto cylinder 58, thereby forming housing 56, ball stop disk 94 is trapped in position between end 60 of cylinder 58 and step 94 of foot valve assembly housing 70. Ball stop disc 96 is flat, which allows piston assembly 100 to "bottom out" completely, as shown below.

Piston assembly 100 is disposed partially in central cavity 74. Piston assembly 100 includes upper piston 103 and lower piston 105, which are threaded together as shown. Upper end 107 of lower piston 105 includes external threads 109 which engage internal threads 111 formed in lower end 113 of upper piston 103. A thread lock such as Loctite ® may be used to secure threads 109 and 111 together. Upper end 102 of upper piston 103 includes bore 104 formed transversely therethrough, which provides a convenient means for attaching piston assembly 100 to the rotary to reciprocal motion translator (FIGS. 12A–12D, 13, 14 and 15).

Lower piston 105 includes upper wear sleeve 115 and lower wear sleeve 117. Upper wear sleeve 115 is disposed about upper portion 126 of lower piston 105, while lower wear sleeve 117 is disposed about lower portion 120 of lower piston 105. Upper wear sleeve is retained on lower piston 105 by upper piston 103, while lower wear sleeve is retained by nut 145. Both wear sleeves 115 and 117 are made of wear resistant material, preferably tungsten carbide, although ceramic sleeves or a stainless steel such as 440C, may be used. Other suitably hard materials or surface coatings may also be used.

Central cavity 74 is separated into a variable volume upper chamber 106 and variable volume lower chamber 108 by the shape of lower piston 105 and the location of first and second packing glands 110 and 112, respectively. First and second packing glands 110 and 112 are also referred to as the upper and lower packing glands respectively. Lower piston 105 has angled step 114 formed intermediate upper portion 126 and lower portion 125, whereat the diameter of lower piston 105 changes. First packing gland 110 seals between cylindrical walls 116 of packing chamber 118 and lower wear sleeve 117. Second packing gland 112 seals between cylindrical walls 122 of packing chamber 124 and upper wear sleeve 115. As can be seen, first packing gland 110 is disposed between lower chamber 108 and upper chamber 106 and seals between lower wear sleeve 117 and the cylindrical walls 116 of housing 58. Similarly, second packing gland 112 is disposed between upper chamber 106 and the ambient environment, and seals between upper wear sleeve 115, and cylindrical walls 122 of housing 58.

Lower piston 105 has an internal flow passage 128 formed internally in lower portion 120. Internal flow passage 128 is in fluid communication with lower chamber 108. A plurality of outlet passages 130 are formed in fluid communication with upper chamber 106 and internal flow passage 128. Each outlet passage 130 has an associated exit 132 which is an opening formed in angled step 114.

Second one way valve assembly 134 is carried by lower piston 105. Second one way valve assembly 134 is also known as the piston valve and includes ball 136 which is held and guided by ball guide 138 disposed in bore 139 of internal flow passage 128. Ball stop disc 140 is disposed adjacent end 137 of ball guide 138. Disc 140 includes a plurality of openings 141 which allow fluid to flow through disc 140 while stopping ball 136 from traveling out of ball guide 138.

Valve seat 148 is disposed at the other end of ball guide 138, and is held in place by compressible gasket 143. Retainer 144 holds gasket 143, valve seat 148, ball guide 138 and ball stop disc 140 in bore 139 as shown. Nut 145 prevents retainer 144 from rotating out of position.

End 62 of cylinder 58 is shown secured to fluid pump support 40. Cylinder 58 has external threads 150 which inter-mesh with internal threads 152 of fluid pump support 40. Locking nut 44 is threaded to cylinder 58 in a similar manner, and is tightened against fluid pump support 40 so that relative rotation between cylinder 58 and fluid pump support 40 is prevented. Upper piston 103 is disposed through and axially supported by bushing 274, which is disposed in bore 270 formed in transmission housing 34.

Figure 2B:
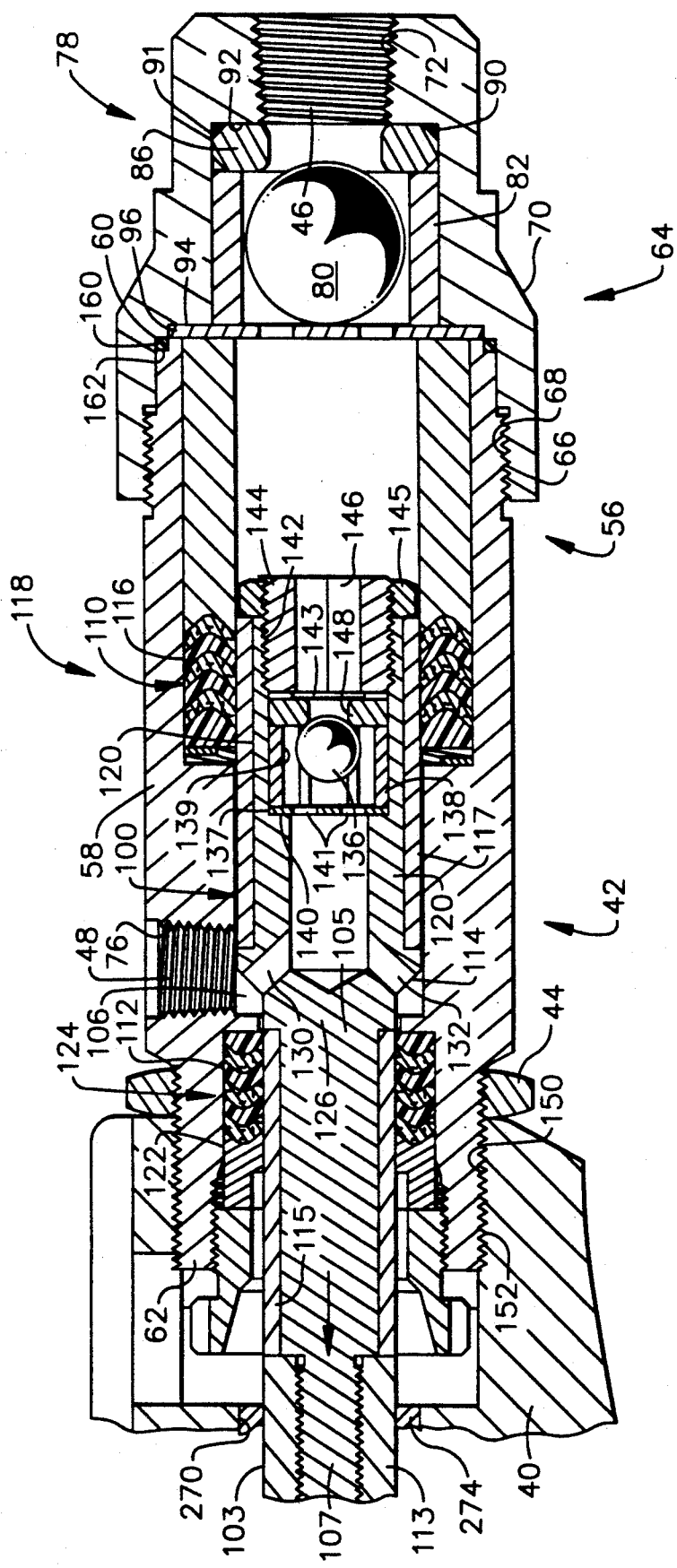
Figure 2C:
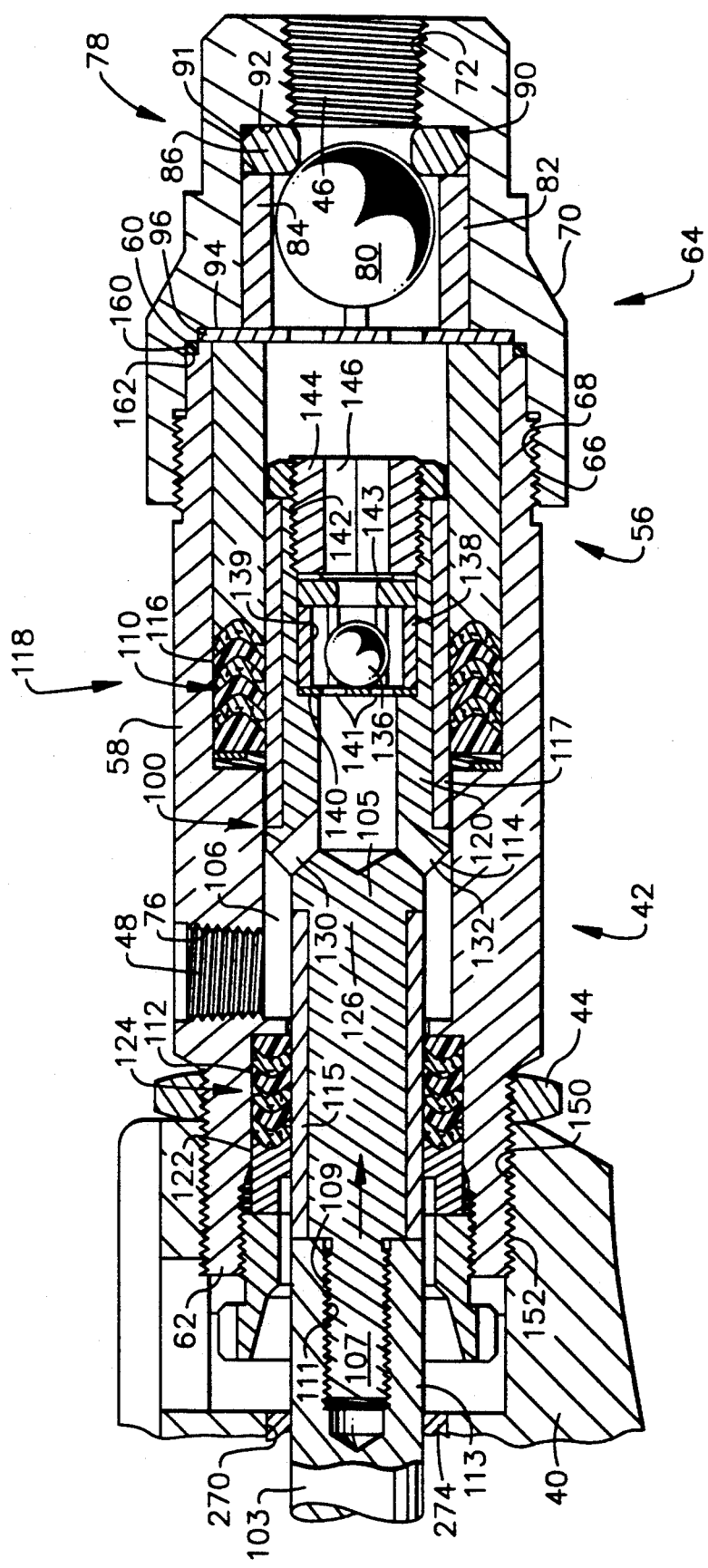
Figure 2D:
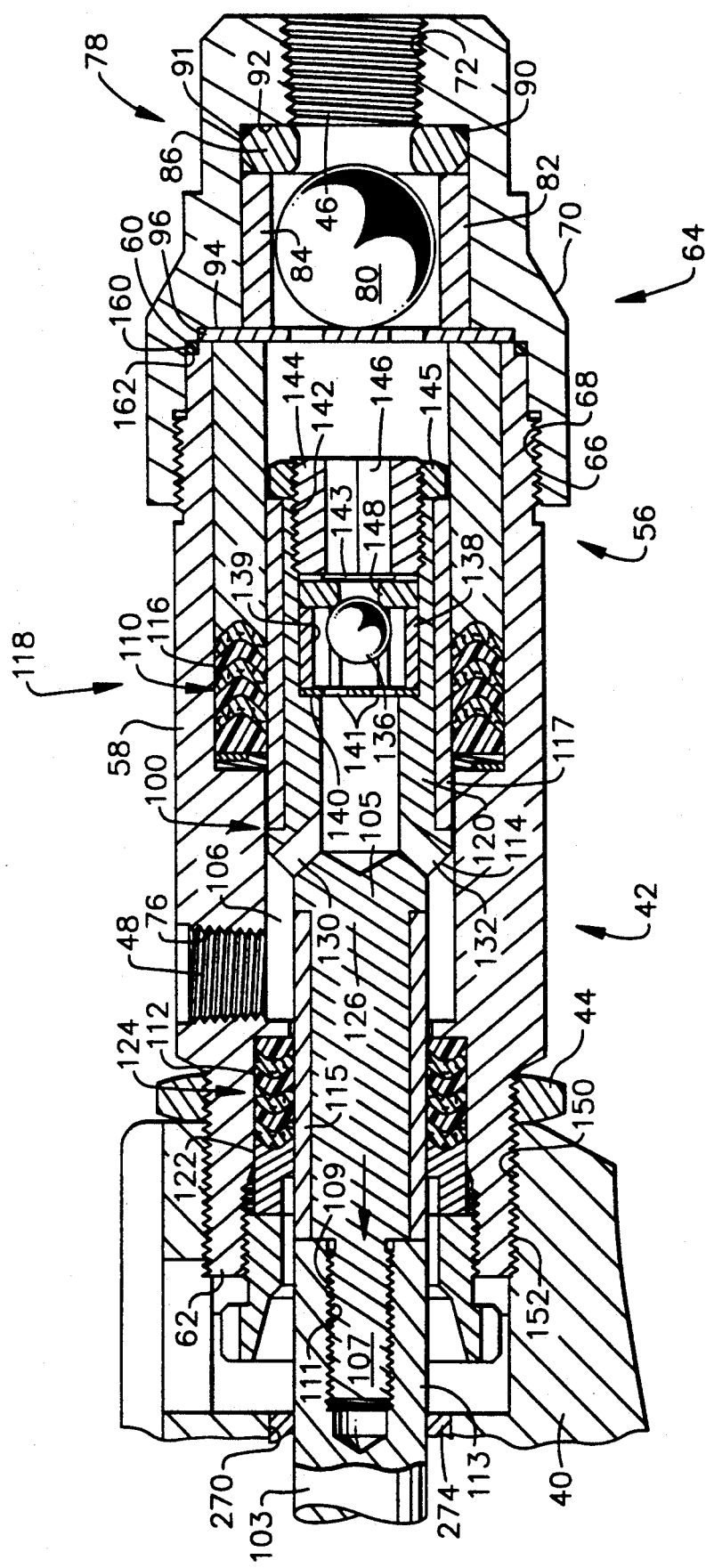

Referring now to FIGS. 2A, 2B, 2C and 2D, piston assembly 100, foot valve 78 and piston valve 134 are shown in various relative positions during one full cycle of the stroke of piston assembly 100. Piston assembly 100 has axis of reciprocation 158 which is generally parallel to and colinear with axis 158A of central cavity 74 (shown in FIG. 11). In FIG. 2A, piston assembly 100 is shown in its bottom dead position just prior to ball 80 becoming unseated and eliminating the sealing relationship between ball 80 and seat 86. In FIG. 2B, piston assembly 100 is shown in its top dead position just prior to ball 136 becoming unseated and eliminating the sealing relationship between ball 136 and seat 148. FIGS. 2C and 2D shows the piston assembly 100 midway between the top dead position and the bottom dead position. Piston assembly 100 in FIG. 2C is reciprocating in the direction of arrow C, towards its bottom dead position. Piston assembly 100 in FIG. 2D is reciprocating in the direction of arrow D, towards its top dead position.

In operation, fluid such as paint, fills the internal cavities and passageways of fluid pump 42. Piston assembly 100 is shown in FIG. 2C as being reciprocated to the right within central cavity 74, decreasing the volume of the lower chamber 108. Due to this motion, the pressure of the fluid in lower chamber 108 is increased. Because the lower chamber pressure is greater than the pressure at fluid inlet 46, fluid attempts to flow from the lower chamber 108 through foot valve 78 and out fluid inlet 46. In this mode, foot valve 78 operates as the one way check valve it is designed to be. Ball 80 is forced against seat 86, thereby forming a seal which prevents fluid from flowing from lower chamber 108 into fluid outlet 46. This occurs once the fluid pressure in lower chamber 108 has exceeded the fluid pressure in fluid inlet 46 by more than a predetermined amount.

As piston assembly 100 is reciprocated toward foot valve assembly 64, the volume of lower chamber 108 decreases, forcing fluid to flow out of lower chamber 108. With flow paths blocked by foot valve 78 and first packing gland 110, the fluid flows through fluid passageway 146 of retainer 144 forcing ball 136 off of seat 148 and allowing relative free flow of the fluid into and through internal flow passageway 128. Ball stop disc 140 prevents ball 136 from traveling out of ball guide 138. The fluid flows from internal flow passageway 128 through outlet passages 130, at an angle to the axis of reciprocation 158. Streams of fluid flow out of associated exits 132 of outlet passages 130 into upper chamber 106.

The change in volume of lower chamber 108 which occurs when the piston assembly 100 is reciprocated from the top dead position shown in FIG. 2B at which the volume of lower chamber 108 is at a maximum, to the bottom dead position shown in 2A at which the volume of lower chamber 108 is at a minimum, is the displacement volume of lower chamber 108. Similarly the change in volume of upper chamber 106 which occurs when the piston assembly 100 is reciprocated from the bottom dead position shown in FIG. 2A, at which the volume of upper chamber 106 is at a maximum, to the top dead position shown in FIG. 2B, at which the volume in upper chamber 106 is at a minimum, is the displacement volume of upper chamber 106. Thus, the reciprocation of piston assembly 100 varies the volume of upper chamber 106 and the volume of the lower chamber 108 in an inverse relation therebetween.

As shown, fluid pump 42 is a "double-acting" pump. This indicates that fluid is pumped out of outlet 48 during both halves of the full cycle of reciprocation of piston assembly 100 (i.e. reciprocating piston assembly 100 from the top dead position of FIG. 2B to the bottom dead position of FIG. 2A and back to the top dead position of FIG. 2B). In order to accomplish this, it is necessary that the displacement volume of lower chamber 108 be greater than the displacement volume of upper chamber 106. In order to obtain a uniform spray from the spray gun, it is necessary to provide a uniform flow of fluid at a uniform pressure. To do so requires that the amount of fluid and the pressure of the fluids exiting the fluid pump through the fluid outlet during each half cycle be the same. Based on the geometry, as is known in the art, the displacement volume of lower chamber 108 is twice the displacement volume of upper chamber 106. Thus, as piston assembly 100 is reciprocated to the right as shown by arrow C in FIG. 2C, fluid flows through outlet passages 130, into upper chamber 106, and a portion of the fluid equal in volume to one-half of the displacement of lower chamber 108 flows out of fluid pump 42 through outlet 48.

In FIG. 2D, piston assembly 100 is reciprocating away from fluid inlet 46. This motion elevates the fluid pressure in upper chamber 106 and internal flow passage 128. Fluid attempts to flow from internal flow passage 128 past unseated ball 136 and through fluid passageway 146. Thus, when fluid pressure in internal flow passage 128 exceeds the fluid pressure in lower chamber 108, ball 136 will assume a closed position as shown in FIG. 2D, adjacent seat 148, forming a seal between ball 136 and valve seat 148.

Two events occur substantially simultaneously during the motion of piston assembly 100 depicted in FIG. 2D. The volume of upper chamber 106 is decreased and the fluid contained in upper chamber 106 is pumped out through fluid outlet 48. The volume of lower chamber 108 is simultaneously increased, resulting in a fluid pressure in lower chamber 108 which is less than the fluid pressure at inlet 46, thereby causing fluid to flow past unseated ball 80 and into lower chamber 108. Ball disc stop 96 prevents ball 80 from traveling out of ball guide 84.

Referring now to FIG. 2B, piston assembly 100 has reached its top dead position, wherein the volume of upper chamber 106 is at a minimum and the volume in lower chamber 108 is at a maximum. Ball 136 is shown still seated against valve seat 148, maintaining the pressure of the fluid in internal flow passage 128, outlet passages 130, upper chamber 106 and outlet 48. Ball 80 remains unseated until piston assembly 100 begins the next downward stroke of the complete cycle. From the position shown in FIG. 2B, piston assembly 100 will reciprocate to the position shown in FIG. 2C and continue the cycle as described above.

As discernible by one skilled in the art, angled step 114 and cylindrical wall 116 could be eliminated and packing gland 110 carried by the piston. Such a configuration would still result in a variable volume lower chamber 108 and variable volume upper chamber 106, and perform substantially as described above.

As shown in the specific embodiment disclosed in FIGS. 2A, 2B, 2C and 2D, first packing gland 110 is disposed such that the end of piston assembly 100 which carries piston valve body 140 does not come in contact with the first packing gland 110. To do so, would result in a decrease of the sealing efficiency, increase wear on the packing gland, and could potentially cut the packing gland. As also shown therein, neither end of respective wear sleeves 115 or 117 contact respective packing glands 112 or 110 during reciprocation of piston assembly 100 to prevent the ends from cutting the glands.

Figure 3A:
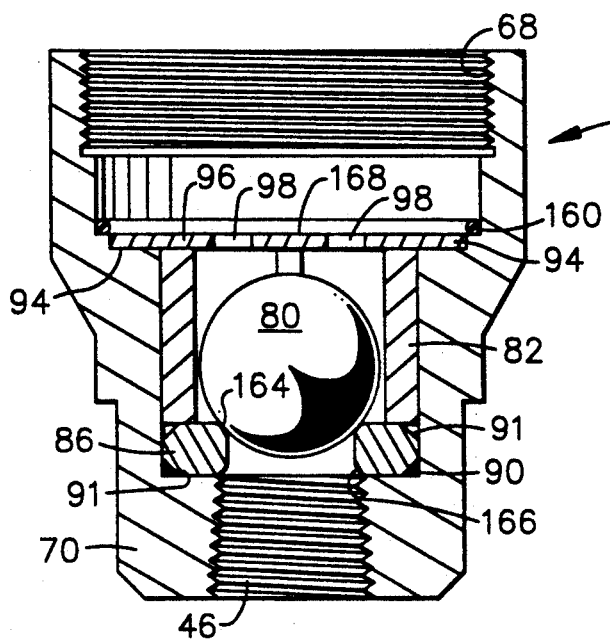
FIG. 3A is a cross sectional view of the foot valve assembly showing the first one way valve in the closed position.

FIG. 3A shows foot valve assembly 64 in cross section, separated from the fluid pump 42. O-Ring 160, which is made of Viton ® or other suitable solvent resistant material, is disposed adjacent step 94, and, when foot valve assembly 64 is secured to cylinder 58, locates in step 162 of end 60, forming a seal therebetween. Ball 80 is shown adjacent valve seat 86 in the closed position, which ball 80 assumes when the fluid pressure in lower chamber 108 exceeds the fluid pressure in inlet 46 by more than a predetermined amount.

Ball 80 contacts seat 86 directly at first sealing surface 164 in sealing engagement therewith. First sealing surface 164 has an annular contact area. Disposed axially opposed to first sealing surface 164 is second sealing surface 166. Prior to initial use, both sealing surfaces 164 and 166 have identical dimensions and shapes. However, due to the abrasive nature of fluid, especially paint, as it flows between ball 80 and seat 86 from inlet 46, and due to the cyclical seating and unseating of ball 80 against sealing surface 164, sealing surface 164 will become worn. Because of the high wear of seat 86, it is typically formed of a very hard material, such as tungsten carbide. Other hard and impact resistant materials may also be used. In order to obtain maximum life from seat 86, second sealing surface 166 is formed so that seat 86 may be reversed with respect to ball.

To reverse seat 86 so that second sealing surface 166 may be used once first sealing surface 164 has worn beyond acceptable limits, foot assembly housing 70 is removed from cylinder 58. Ball stop disc 98 and ball guide 82 are removed from housing 70. The orientation of seat 86 is reversed with respect to ball 80 and reinserted into housing 70, looking just like FIG. 3A. Foot valve assembly 64 is then reassembled to cylinder 58 in the reverse of the order described above.

When fluid is being drawn into lower chamber 108 due to the reciprocation of piston assembly 100, ball 80 is forced away from sealing engagement with seat 88 and is piloted by ball guide 82. The axial displacement of ball 80 is limited by center portion 168 against which ball 80 may rest. The axial distance from between ball stop disc 96 and associated center portion 168, and seat 86 is selected to allow ball 80 enough axial travel so as to permit adequate fluid flow between the ball 80, seat 86 and through ball guide 82 (as will be described below), while retaining ball 80 in close proximity to valve seat 86 so that when the pressure in lower chamber 108 exceeds the fluid pressure in inlet 46 by more than a predetermined amount, ball 80 will assume a closed position in sealing engagement with seat 86. Ball 80 is moved to the closed position by the momentary flow of fluid against the ball in the direction from the lower chamber 108 into inlet 46, which creates a fluid drag on ball 80, causing it to seat itself, thereby forming a seal and closing the valve. The higher pressure in lower chamber 108 as compared to the pressure in fluid inlet 46 causes ball 80 to remain seated during this portion of the reciprocation cycle of piston assembly 100.

As can be seen in FIGS. 2A–2D and 3A, first and second sealing surfaces, 164 and 166, are shown as being rounded edges. These convex sealing surfaces 164, 166 provide improved flow of liquid past ball 80. As will be described below, more fluid can flow past ball 80 for the same amount of axial displacement of ball 80, known as "lift". The convex shape of sealing surfaces 164, 166 allows an increase in the radial distance between the seat and ball.

Figure 3B:
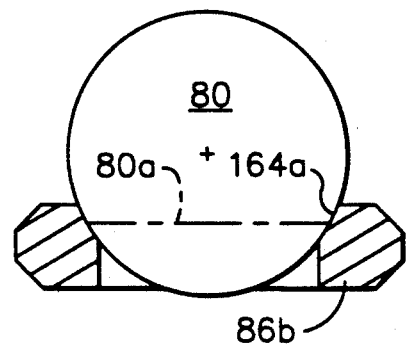
FIG. 3B is a fragmentary enlarged view of a prior art tapered valve seat and ball.
Figure 3C:
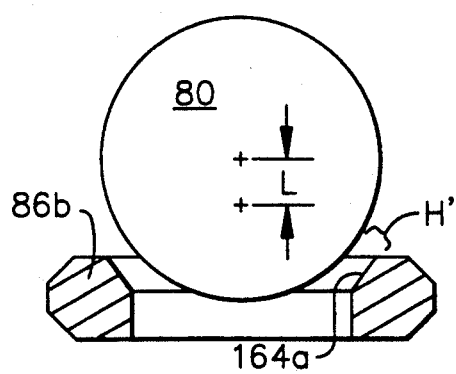
FIG. 3C is a fragmentary enlarged view of the valve seat of FIG. 3B with the valve in the open position.

Referring now to FIG. 3B, a typical prior art tapered sealing surface is shown. Sealing surface 164a has a frustoconical shape, which is angled so that it is tangent to ball 80 at the line of circular contact 80a between the two. FIG. 3C shows ball 80 in the unseated position, thereby allowing fluid to flow between seat 86b and ball 80. Fluid flowing therebetween flows tangentially to the circumference of ball 80. The shape of sealing surface 164a produces turbulent flow through the annular path between ball 80 and seat 86b. The edges of sealing surface 164a provide a location for paint to collect, where it becomes gummy. After a period of use, enough paint may collect to form a layer on the surface of sealing surface 164a, thereby preventing ball 80 from forming an adequate seal therewith. This is a particularly serious problem as it creates substantial parasitic losses and potentially renders the fluid pump completely inoperative. It also produces less flow due to the decrease in the cross sectional area of the annular flow path, and requires more energy to operate the pump. If ball 80 will not seal, fluid will leak around ball 80 and back into and out fluid inlet 46. This results in erosion of the ball at the high operational pressures of the pump. Such a condition is referred to as "packing out on the seat". The more solids which a paint fluid contains, the greater the tendency to "pack out on the seat" and erode the ball. Because new paints are continually being introduced with high percentages of solids, this problem is becoming more prevalent throughout the industry.

Figure 3D:
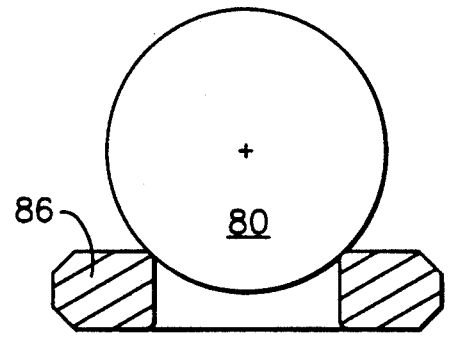
FIG. 3D is a fragmentary enlarged view of the convex valve seat and ball of the present invention.
Figure 3E:
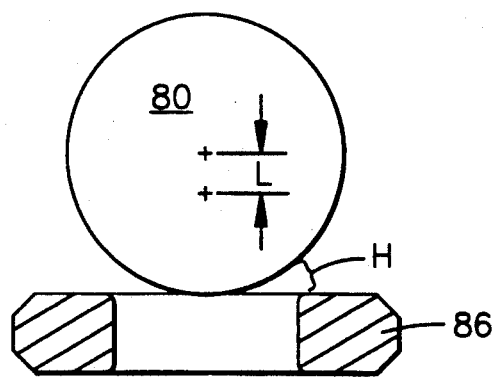
FIG. 3E is a fragmentary enlarged view of the valve seat of FIG. 3D with the valve in the open position.

Referring now to FIGS. 3D and 3E, an enlarged fragmentary cross-sectional view of convex sealing surfaces 164 and and 166 and ball 80 of the present invention are shown. As is shown in FIG. 3E, a given lift L of ball 80 results in a radial distance H between seat 86 and ball 80. Geometrically, the same lift L of ball 80 when used with the prior art seat 86b shown in FIG. 3C produces a smaller radial distance H' between ball 80 and sealing surface 164a, while maintaining the same cross sectional area of the annular flow path. This shorter distance H' combines with the sharp shape of sealing surface 164a to produce turbulent flow between the ball and seat.

The shape of convex sealing surface 164, in combination with the greater radial distance H, reduces the turbulence of the flow, thereby promoting laminar flow and resulting in little or no collection or coagulation of paint at the sealing surface 164. Thus, ball 80 continues to seat directly against sealing surface 164 throughout the life of the valve. The present invention has been observed to work acceptably with a convex sealing surface having a 0.030 inch radius, when used in combination with a ball having a diameter of ⅜ inch to ⅞ inch. A radius as low as 0.010 inches will also work.

Figure 4A:
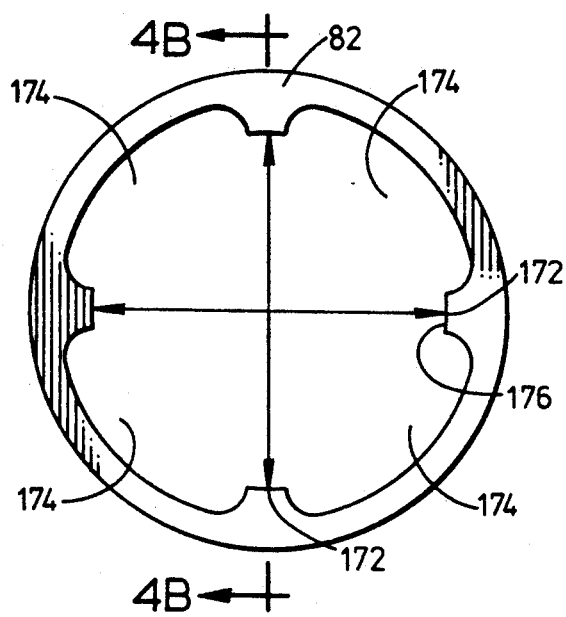
FIG. 4A is an end view of the ball guide of the foot valve
Figure 4B:
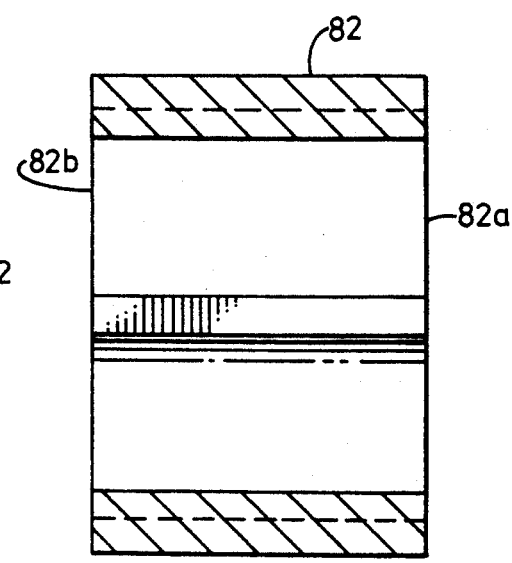
FIG. 4B is a side view of the ball guide of FIG. 4A.

Referring to FIG. 4A, ball guide 82 has ball piloting diameters 172 which are sized to allow free axial movement of ball 80, without much radial displacement. There is minimal clearance between ball 80 and ball guide 82 at piloting diameter 172 to allow this to occur. In order to allow flow through the foot valve assembly 78, it is necessary to provide adequately sized ball guide flow paths 174 around ball piloting bore 176.

Flow paths 174 extend radially outward from piloting bore 176, and communicate with piloting bore 176 and both ends 82A and 82B of ball guide 82. Thus, when ball 80 is unseated and located substantially in piloting bore 176, fluid flows between ball 80 and seat 86, through flow paths 174 around ball 80, and through openings 98 in ball stop disc 96.

Figure 5A:
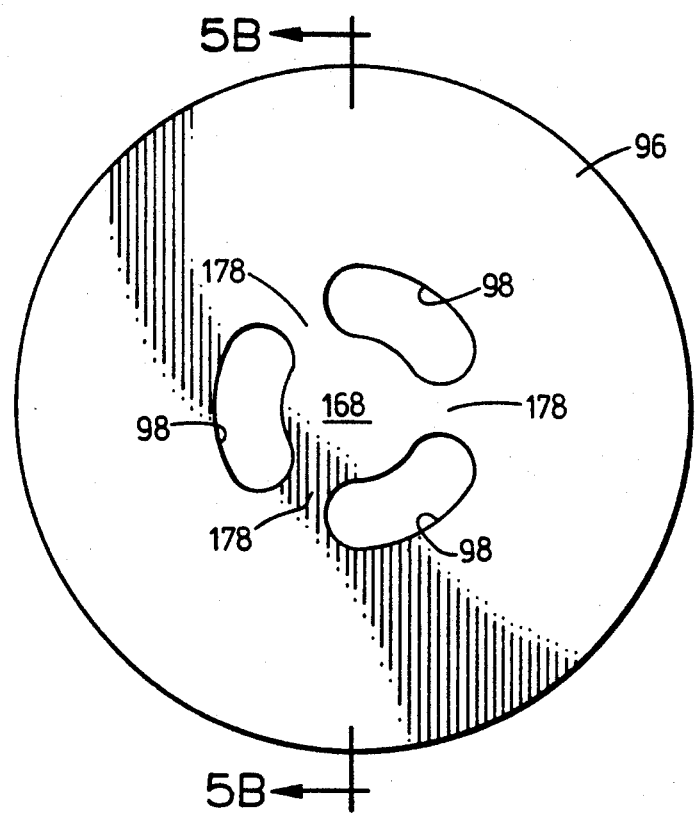
FIG. 5A is an end view of the ball stop disc of the foot valve assembly.
Figure 5B:
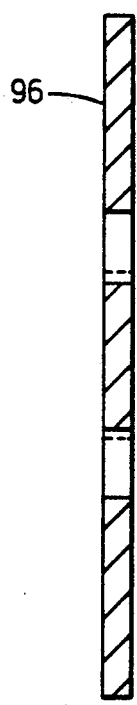
FIG. 5B is a side view of the ball stop disc shown in FIG. 5A.

FIG. 5A is an end view of ball stop disc 96. Openings 98 are disposed so as to allow adequate flow from ball guide paths 174, through openings 98 and into lower chamber 108. Center portion 168 is supported by ribs 178, and is disposed to align with the axial travel of ball 80. FIG. 5B shows a side view of ball stop disc 96.

Figure 6:
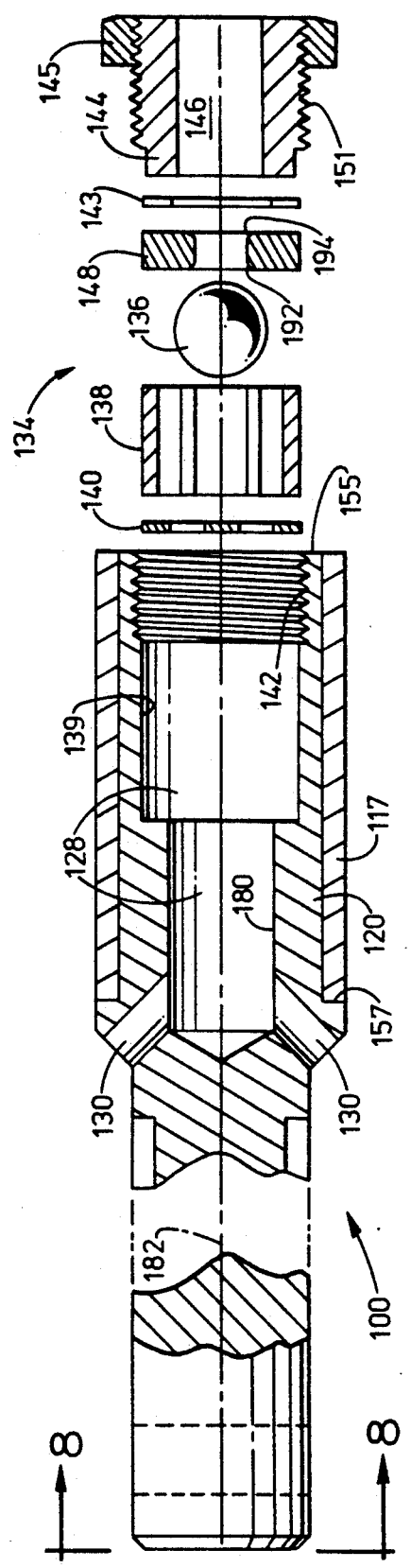
FIG. 6 is an exploded view of the reciprocating piston, shown in partial cross section.

Referring to FIG. 6, there is shown a partial exploded view of piston assembly 100, primarily lower piston 105 and piston valve assembly 134. Internal flow passage 128 is formed along piston axis of reciprocation 182. In the preferred embodiment, larger bore 139 is formed intermediate both ends of flow passage 128, in which ball stop disc 140, ball guide 138, ball 136, seat 148, and gasket 143 are disposed. In piston valve assembly 134, the axial movement of ball 136 is constrained by ball stop disc 140 and the radial movement of ball 136 is constrained by ball guide 138 in a manner similar to the operation of ball stop disc 96 and ball guide 82 of foot valve assembly 64.

Figure 7B:
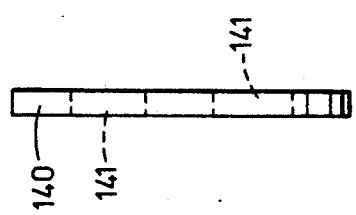
FIG. 7B is a side view of the ball stop disc shown in FIG. 7A.
Figure 7A:
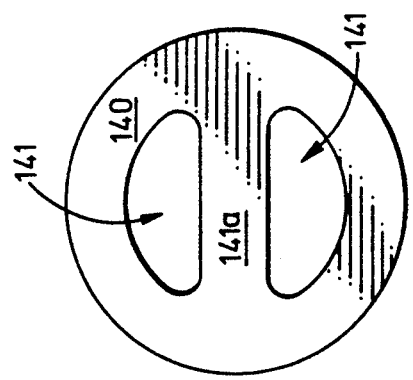
FIG. 7A is an end view of the ball stop disc of the piston.

Ball guide 138 is similar in structure to ball guide 82. Ball stop disc 140 is shown in FIG. 7A and 7B, and has two openings 141 separated by center portion 141a.

Retainer 144 has external threads 151 which, when assembled, mesh with internal threads 142 of one end of bore 139. Retainer 144 has hollow hex shaped interior passageway 146, which allows easy installation into bore 139. Retainer 144 captures ball stop disc 140, ball guide 138, ball 136, seat 148 and gasket 143 in bore 139. Compressible gasket 143 seals between valve seat 148, the retainer 144 and bore 139 to prevent fluid from leaking around the outside diameter of valve seat 148 past threads 153. Gasket 143 may be made of any suitable material such as nylon.

Stop nut 145 is threaded onto threads 151 of retainer 144 and, when assembled, is tightened against end 155 of lower piston 105 to prevent retainer 144 from rotating moving relative to lower piston 105.

As with the seat 86, seat 148 may be formed of tungsten carbide, or other suitable material described above, because of the abrasiveness of the fluid flowing around it, and the wear of the cyclical seating and unseating of ball 136. In order to minimize the cost of seat 148 it is made as small as possible.

Valve seat 148 has first sealing surface 192 and second sealing surface 194, which are located axially opposed to each other. First and second sealing surfaces 192 and 194 are convex surfaces, similar to surfaces 164 and 166 described above with respect to foot valve 78. This convex shape of surfaces 192 and 194 serve the same function and are subject to the same parameters as described above with respect to surfaces 164 and 166.

When first sealing surface 192 has worn beyond acceptable limits, seat 148 may be rotated so that the orientation of seat 148 is reversed with respect to ball 136, thereby orienting second sealing surface 194 so that when ball 136 assumes a closed position in sealing engagement with seat 148, it is in direct contact with second sealing surface 194.

As shown in FIG. 6, lower wear sleeve 117 is disposed about portion 120 of lower piston 105, captured between annular step 157 of lower piston and locknut 145 (when assembled). Lower wear sleeve 117 has a slip fit about potion 120 so that it may be removed and replaced when its outer diameter has worn beyond acceptable limits. This allows a high wear resistant material to be used against packing gland 110 without making the entire piston from such a material, thereby lowering the cost. It also allows the portion worn by the packing gland 110 to be replaced without replacing the entire piston. Lower wear sleeve 117 may also be secured in place by an appropriate adhesive. Leakage between sleeve 117 and lower piston 105 should not occur due to the slip fit therebetween. As shown, the thickness of sleeve 117 is approximately equal to the radial width of annular step 157.

Figure 8:
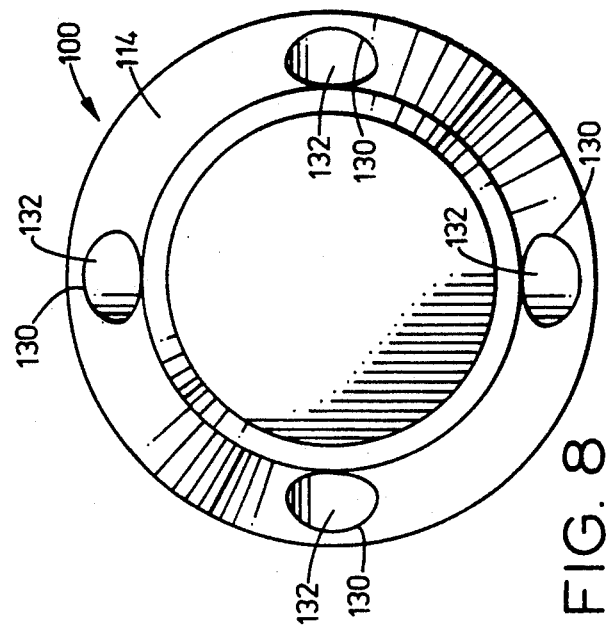
FIG. 8 is an end view of the piston taken along line 8—8 of FIG. 6, showing the flow passage exits formed in the piston (all hidden lines omitted).

FIG. 8 shows a view of piston assembly 100 taken along line 8 of FIG. 6. As shown in this view, outlet passages 130 terminate at exit 132 formed in angle step 114.

Referring to FIG. 9, fluid flows through internal flow passage 128, generally parallel to and in the direction of fluid flow direction arrows 198 along central bore 180. Fluid thereafter flows from internal flow passage 128 and is directed radially outward by outlet passages 130, which are in fluid communication with the internal flow passage 128.

Outlet passages 130 redirect the fluid flow from substantially axial flow to axial and radial flow in the form of streams of fluid which flow through fluid passages 130 and out associated exit 132. Outlet passages 130 are oriented so the streams of fluid form acute angles 202 with axis of reciprocation 182. This angle is illustrated in FIG. 9 as angles 202 formed between fluid flow direction 200 and axis of reciprocation 182.

This orientation of outlet passages 130 allows the overall length of lower piston 105 to be reduced slightly, resulting in a savings of material. The orientation of outlet passages 130 also help to produce and maintain laminar flow, resulting in less efficiency losses caused by turbulence due to the redirection of the fluid through a ninety degree angle as found in the prior art. As shown in this embodiment, angle 202 is approximately 45 degrees, which represents a tradeoff between piston length, flow direction and manufacturability. Angled step 114 is perpendicular to the flow direction of the stream of fluid, represented by arrows 200. This simplifies the manufacturing of lower piston 105, as it is difficult to drill holes into a cylindrical object at angles which are not perpendicular to the surface. However, such manufacturability is not a constraining factor, as various manufacturing techniques may allow one to adapt the angular relationship between angled step 114 and the orientation of outlet passage 130 to be relatively independent of each other. While the angle shown is approximately 45 degrees, a wide range of angles is acceptable. The critical consideration is that the angle represented by arc 202 be less than 90 degrees.

Upper wear sleeve 115 is disposed about portion 126 of lower piston 105, captured between annular step 159 and upper piston 103. Upper wear sleeve 115 also has a slip fit about portion 126 so that it may be removed and replaced when its outer diameter has worn beyond acceptable limits. The advantages and construction are similar to lower wear sleeve 117 as discussed above.

Figure 10:
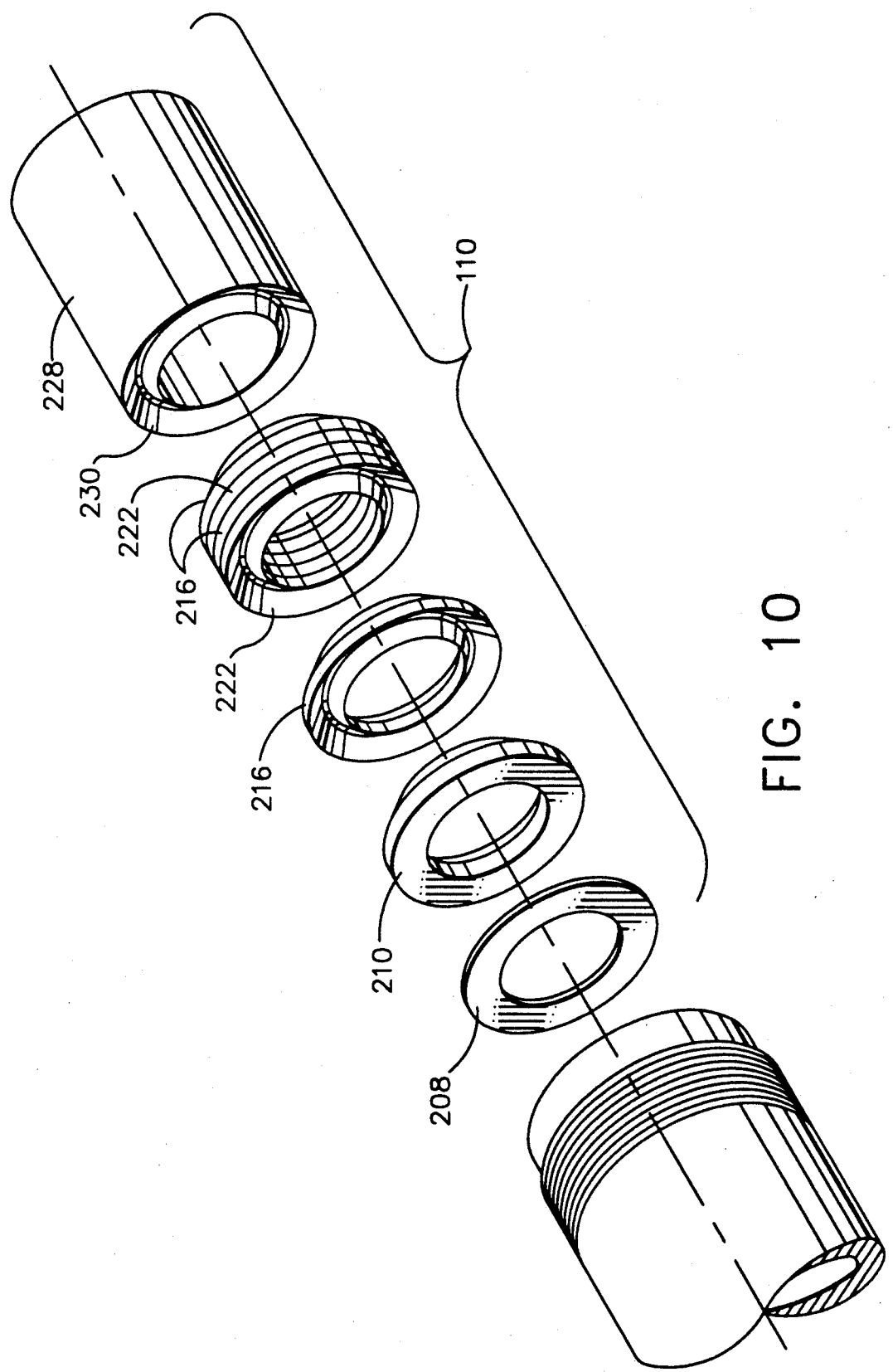
FIG. 10 is an exploded perspective view of the lower packing gland which separates the lower chamber from the upper chamber.

Referring now to FIG. 10, there is shown a a partially exploded view of first packing gland 112. FIG. 11 shows a cross sectional view of chamber 58 and first and second packing glands 110 and 112. In reference to packing gland 112, packing chamber 118 is formed in cylinder 58. Packing chamber 118 has cylindrical walls 116 and base 204, which is formed by a step between cylinder walls 116 and internal wall 206 of central cavity 74. Cylindrical wall 116 terminates at first end 60 of cylinder 58, forming opening 60A. When piston assembly 100 is disposed in central cavity 74, as shown in FIG. 2A, cylindrical walls 116 are in a spaced concentric relationship to the piston, about axis of reciprocation 182.

Annular wave spring 208, having an outside diameter slightly smaller than the inside diameter of cylindrical walls 116, and having an inside diameter slightly larger than the inside diameter of walls 206, is disposed in packing chamber 118 adjacent base 204.

Packing adaptor 210, having the same diameter dimensional constraints as spring 208 is disposed in packing chamber 118 adjacent spring 208. Packing adaptor 210 is formed as an annular ring having flat face 212 which contacts annular spring 208. The other end of packing adaptor 210 constitutes packing ring support surface 214 having a V-shaped cross section. As described below, V-shaped support surface 214 is complimentary to the shape of the packing rings, and allows the packing rings to be stacked in alignment with each other and packing adaptor 210 about the piston. Packing adaptor 210 may be made of Delrin®, an acetyl resin, or other similar material.

Disposed in packing chamber 118 adjacent packing adaptor 210 is a plurality of V-shaped packing rings 216. Packing rings 216 are preferably made of leather, or other material such as rubber or other suitable sealing material, which is relatively stiff, yet can deflect under axial loads. Each packing ring has an associated inner surface 218 and outer surface 220. As shown in FIG. 11, the preferred embodiment includes a plurality of V-shaped spacers 222, one each disposed between each packing ring 216. Spacer 222 may be made from Teflon® or other a high density, high molecular weight polyethylene material, or other suitable hard, rigid material. Each spacer 222 has respective inner surfaces 224 and outer surfaces 226 associated therewith. Finally, also disposed in packing chamber 116, is second packing adaptor 228, also made of Delrin®. Second packing adaptor 228 has V-shaped recess 230 at one end which is disposed adjacent packing rings 216, and shaped complimentary to mate therewith. The overall length of spacer ring 228 is such that, in the free uncompressed state, the total stacked length of annular spring 208, packing adaptor ring 210, packing rings 216, V-shaped spacers 222 and second packing adaptor 228 is greater than the depth of packing chamber 118 from end 60 to base 204. This is shown by the over hanging portion 232 of packing spacer ring 228 in FIG. 11. When foot valve assembly 64 is threaded onto end 60 of cylinder 58, packing adaptor 228 is compressingly urged against packing rings 216 by foot valve assembly 64. In particular, as depicted in FIG. 2A, ball stop disc 96 directly contacts the packing adaptor 228.

The axial displacement of over hanging portion 232, in combination with annular wave spring 208 creates an axial load on V-shaped packing rings 216 and V-shaped spacers 222. The result of the axial load in conjunction with V-shape is a tendency to flatten out V-shaped packing rings 216, causing an expansion of the diameter of outer surfaces 220 and a contraction of the diameter of the inner surfaces 218. This expansion causes outer surface 220 to sealingly engage cylinder walls 116. The contraction causes inner surfaces 218 to sealingly engage lower wear sleeve 117. This results in packing rings 216 being resiliently biased into sealing engagement with cylinder walls 116 and lower wear sleeve 117 and to remain so engaged as packing gland 110 wears due to reciprocation of piston assembly 100.

V-shaped spacers 220 are sized to provide a sealing effect between inner surface 224 and sleeve 117 of piston assembly 100, and between outer surface 226 and cylinder walls 116. Additionally, V-shaped spacers 222 may be omitted or replaced with additional packing rings 216.

At second end 62 of cylinder 58, second packing gland 112 is comprised of similar V-shaped packing rings 217 separated by similar V-shaped spacers 223.

Packing adaptor 211 is disposed at one end of packing gland 212 and packing adaptor 234 is disposed at the other end. Hollow packing retainer 236 threadingly engages internal threads 237 of end 62. Rotational adjustment of retainer 236 controls the axial force on packing gland 112. This axial load biases V-shaped packing rings 217, and V-shaped spacers 223 into sealing engagement with cylindrical wall 122 and upper wear sleeve 115. The sealing forces may be adjusted by rotating retainer 236 to compensate for initial tolerance stackup of the components. As second packing gland 112 wears, the axial force may be increased by further advancing retainer 236. An annular spring may alternatively be disposed intermediate the packing chamber base and the packing adaptor, similar to that shown with packing gland 110.

As is obvious to one skilled in the art, any side forces which are exerted on piston assembly 100 can be transferred to the packing glands, resulting in premature failure of either packing gland 110 or 112. Such side forces are particularly present when fluid pump 42 is reciprocated by a source of rotary power, such as electric motor 28 (FIG. 13). In order to reduce such side forces, and potentially eliminate them altogether, the preferred embodiment of the present invention incorporates an open side scotch yoke mechanism 248 which includes means for reducing the side forces exerted on piston assembly 100 which are generated by operation of the open side yoke mechanism 248.

Figure 12B:
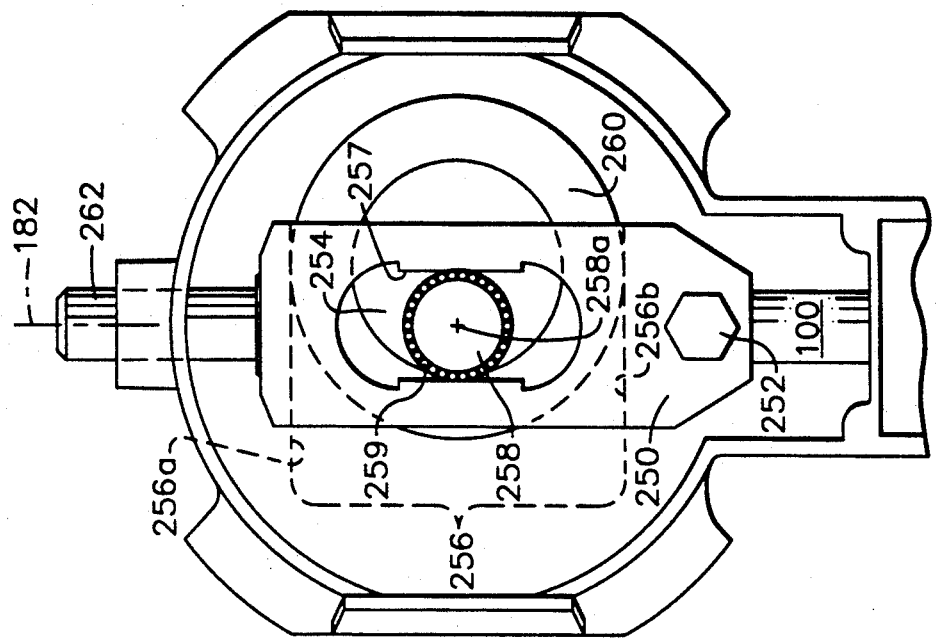
FIGS. 12A, 12B, 12C and 12D are diagrammatic end views showing the scotch yoke mechanism for translating rotary power to reciprocating power, showing the yoke and crank in four different positions.
Figure 12A:
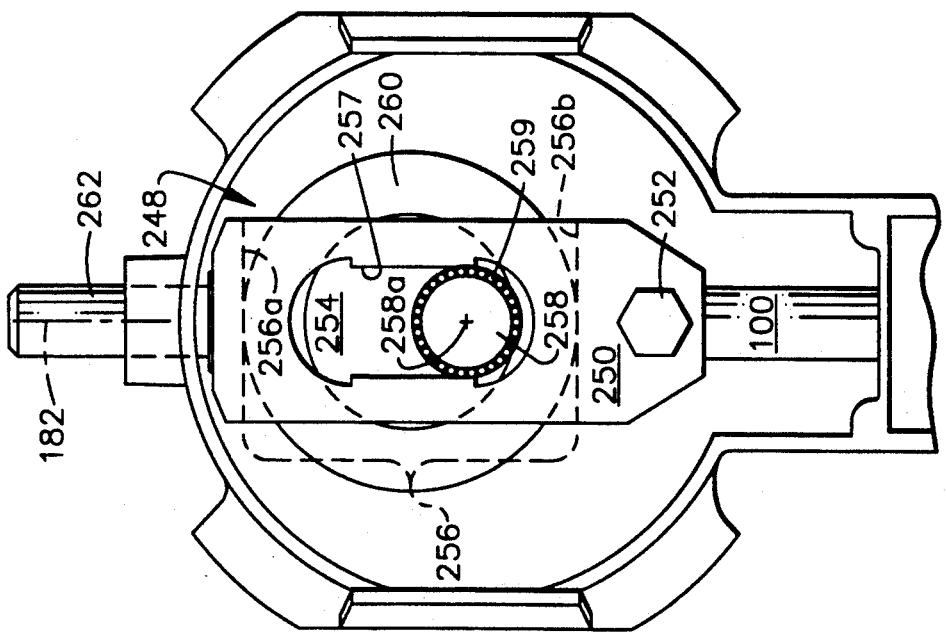
Figure 12D:
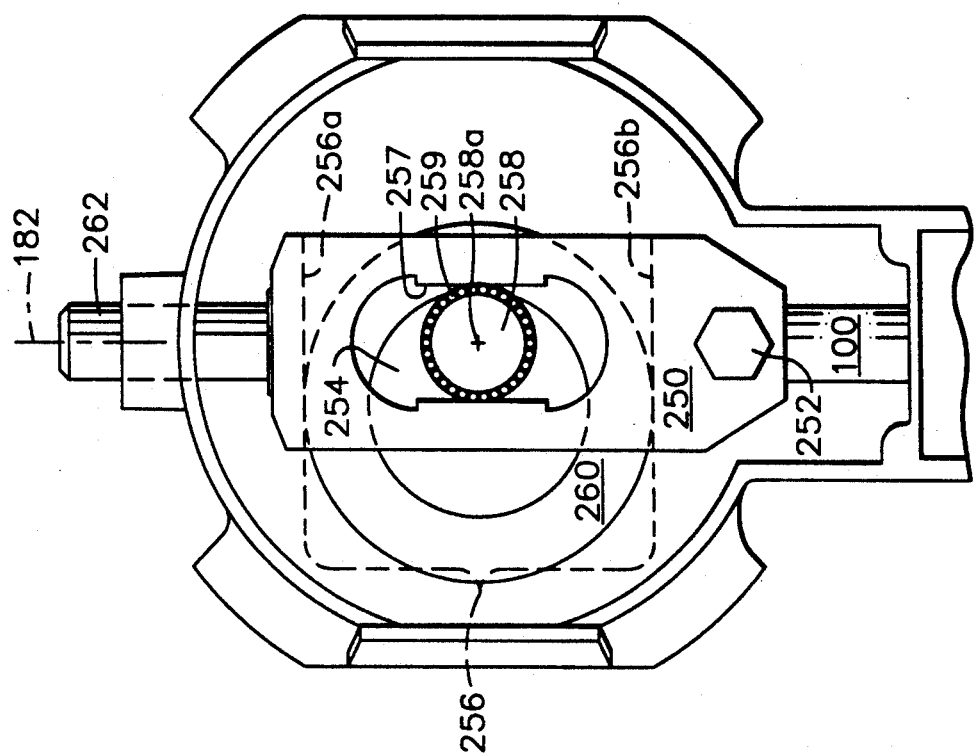
Figure 12C:
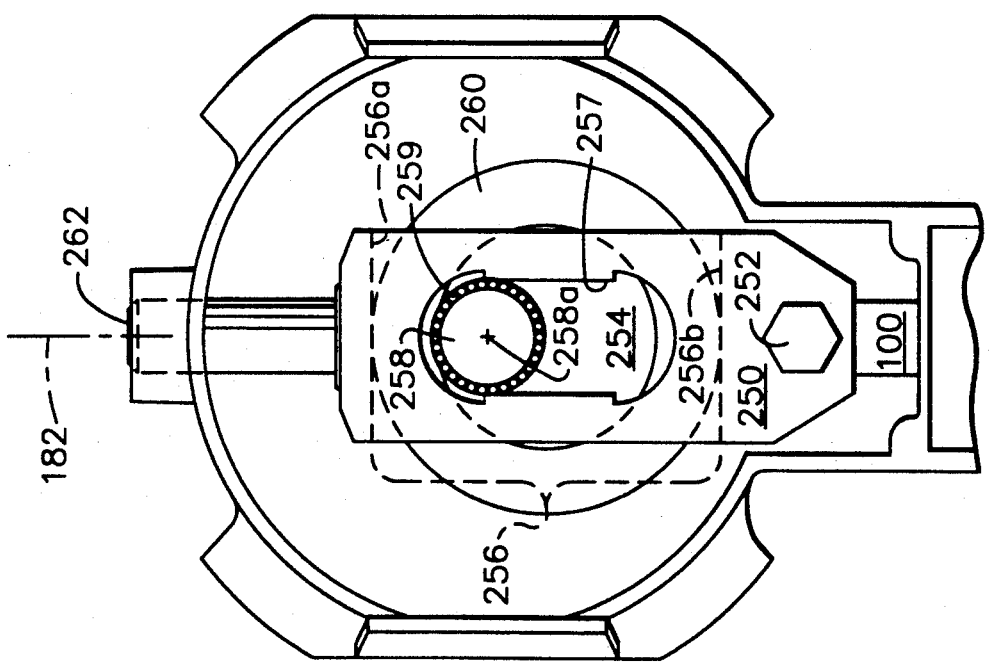

As shown in FIG. 12A, open side scotch yoke mechanism 248 includes yoke 250 which is connected to piston assembly 100 by threaded fastener 252. Yoke 250 has open side recess 256 (also shown in FIG. 13) which is defined by surfaces 256a and 256b. Surfaces 256a and 256b are disposed substantially perpendicular to axis of reciprocation 182 as shown, and extend for only a portion of the thickness of yoke 250. Open side recess 256 is formed on the rear side of yoke 250. The horizontal width of recess 256, as well as of surfaces 256a and 256b, is greater than twice the eccentricity of crank 254. Shaft 258 of crank 254, and bearing 259 disposed thereabout, are received by slot 257 formed through yoke 250. Shaft 258 extends through slot 257, while bearing 259 is disposed substantially entirely within slot 257. Bearing 259 contacts slot 257 as shown, providing support for yoke 250. Shaft 258 rotates concentrically about axis of rotation 258a. The vertical length of slot 256 is greater than the outside diameter of bearing 259 plus twice the eccentricity of crank 254.

Motor bell housing 30 of electric motor 28 (not shown) is secured to the transmission housing 34 (not shown). Electric motor 28 has axis of rotation 258a which is perpendicular to the plane of FIG. 12A. Through a planocentric drive mechanism, motor 28 drives crank 254 and crank bearing 260 which are disposed within recess 256. Crank 254 is eccentrically revolved about and oriented substantially parallel to axis of rotation 258a. Crank bearing 260 contacts a portion of inner surfaces 256a and 256b of open side recess 256, thereby causing yoke 250 to reciprocate piston assembly 100 as crank 254 revolves eccentrically about axis of rotation 258a. FIGS. 12A through 12D show the reciprocation of piston assembly 100 along the axis of reciprocation 182 resulting from one revolution of crank 254 about axis of rotation 258a.

In order to reduce the side forces on piston assembly 100 which are generated by the operation of open side scotch yoke mechanism 248, guide post 262 is shown extending from yoke 250 in the direction which is opposite piston assembly 100. Guide post 262 of the preferred embodiment is formed integral with yoke 250 and is substantially colinear with piston assembly 100.

Referring now to FIG. 13, which is a cross sectional view of planocentric drive mechanism 284 and scotch yoke mechanism 248, transmission housing 34 is shown having first bore 268 and second bore 270. Bores 268 and 270 are spaced apart from each other and are colinear, located along axis of reciprocation 182 of piston assembly 100. First bushing 272 is disposed in first bore 268, and guide post 262 is bearingly supported therein. Guide post 262 extends at least partially into bushing 272, and is shown in FIG. 13 as extending all the way through. Bushing 272 slideably supports guide post 262 and constrains the motion of guide post 262 to axial motion along axis of reciprocation 182.

Similarly, second bushing 274 is disposed in second bore 270, and piston assembly 100 is bearingly supported by bushing 274. In this embodiment, upper piston 103 is disposed through bushing 274, and connected to yoke 250. Bushing 274 slideably supports upper piston 103 and constrains the motion of piston assembly 100 to axial motion along axis of reciprocation 182.

Window 35 of transmission housing 34 provides access to retainer 236, allowing adjustment of upper packing gland 112 while fluid pump 42 is attached to transmission housing 34.

Figure 14:
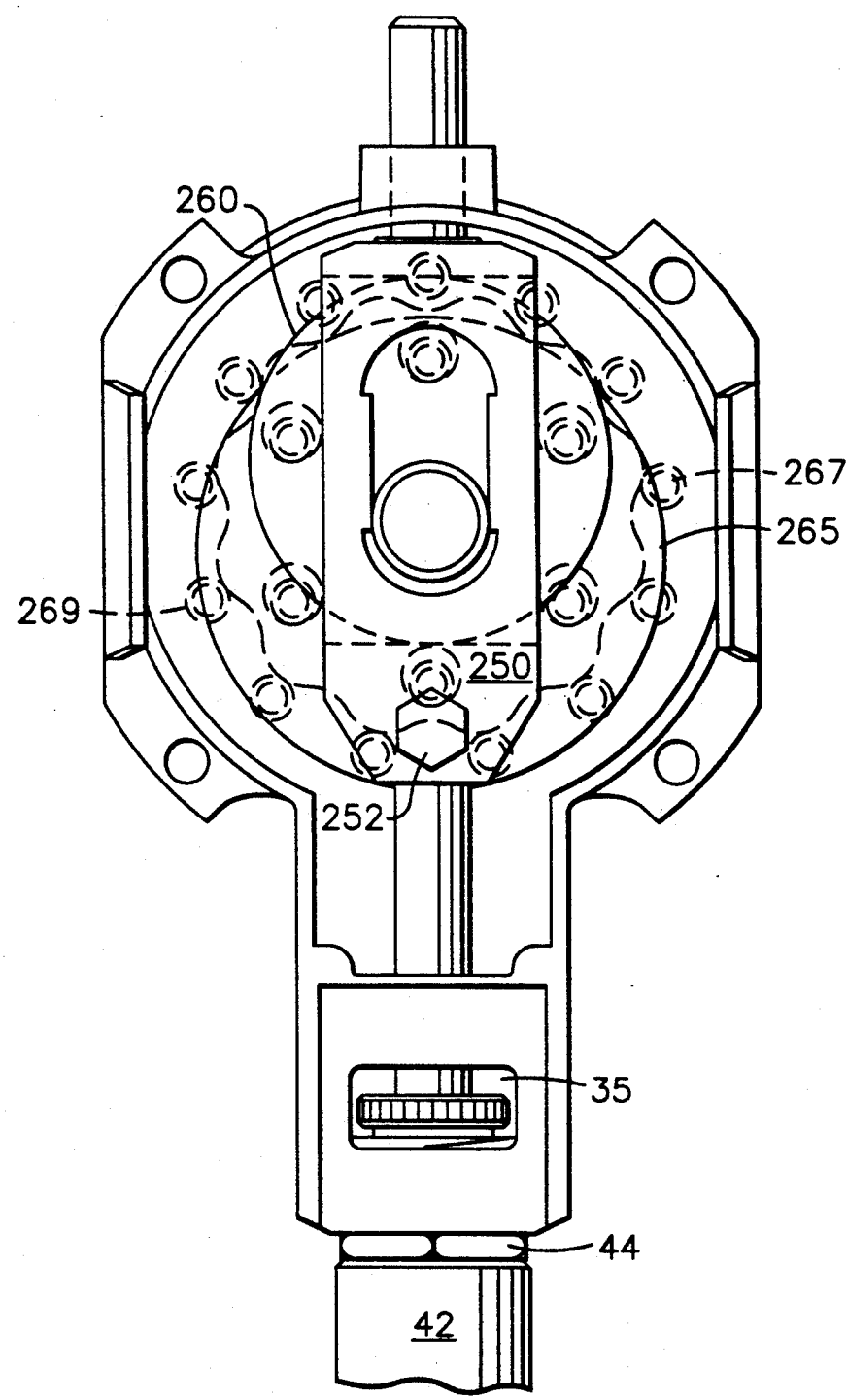
FIG. 14 is an end view of the scotch yoke mechanism and the planocentric drive mechanism showing certain components of the planocentric drive mechanism in hidden lines.

In order to obtain the required operating speeds for fluid pump 42, it is frequently necessary to incorporate a speed reducer between the source of rotary power and the fluid pump. In the present case, as depicted in FIGS. 13, 14 (hidden lines) and 15, a particularly advantageous transmission design is incorporated. Planocentric drive mechanism 284 is connected to and driven by output shaft 29 of electric motor 28. Planocentric reduction drive mechanisms are well known. The name planocentric is generally used to describe the type of gear reduction gear set as shown in FIGS. 13, 14 hidden lines) and 15. Various embodiments of planocentric gear drives are disclosed in U.S. Pat. Nos. 1,770,035; 2,250,259; 2,874,594; 3,056,315; 3,056,351; 3,073,184; 3,192,799; 3,383,931; and 4,023,440 which are incorporated herein by reference.

As shown best in FIG. 13, output shaft 29 of electric motor 28 extends past motor bell housing 30 and into the internal cavity formed in transmission housing 34. Eccentric cam 280 and counter weight 281 is non-rotatably carried by shaft 29, being secured thereto by woodruff key 282 which is disposed in a complimentarily keyways formed in shaft 29, eccentric cam 280 and counterweight 281. Threaded set screw 286 is disposed through a threaded hole in the counterweight against shaft 29, creating a clamping load therebetween which prevents axial movement of counterweight 281 relative to shaft 29.

Bore 255 is formed in output shaft 254a formed integrally with crank 254 and shaft 258. Bore 255 is concentric about axis of rotation 258a. Two bearings 257 and 259 are disposed in bore 255. Shaft 29 is disposed through the inner races of bearings 257 and 259, thereby rotatably supporting output shaft 254a. Shaft 258 is rotatably supported by bearing 261, which is supported by transmission housing 34 and secured thereto by fastener 263. Thus, shaft 258 is rotatably supported by transmission housing 34.

Output shaft 254a includes radially extending flange portion 265 and axially extending flange portion 265a. Relief 256b is formed in flange 265, which offsets the eccentric weight of crank 254 so that the integral output shaft 255, crank 254 and shaft 258 is balanced about axis of rotation 258a.

Figure 15:
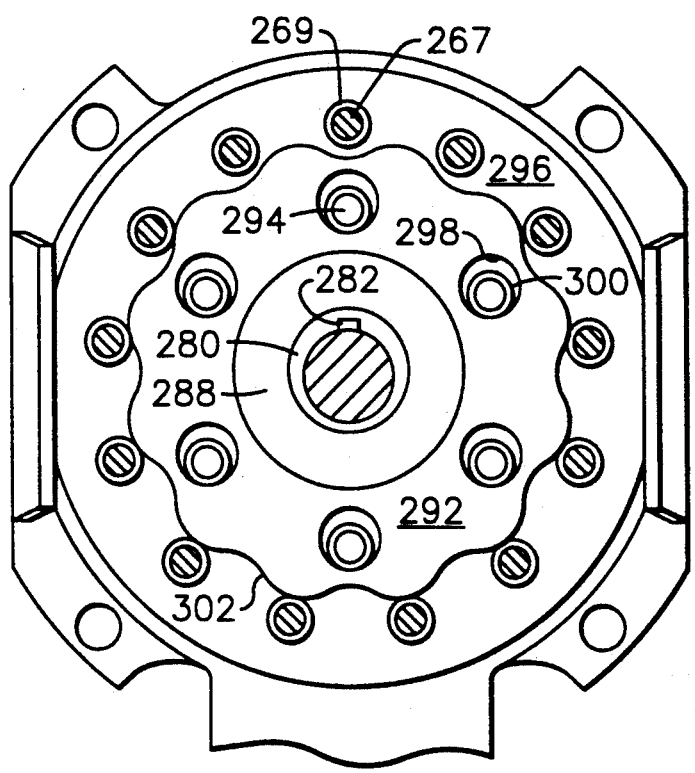
FIG. 15 is a cross sectional view taken along line 15—15 of FIG. 13 of the planocentric drive mechanism showing the pinion gear and pins.

Referring also to FIG. 15, eccentric cam 280 carries bearing 288, which rotatably supports and eccentrically oscillates pinion gear 292. Counter weight 281 offsets the eccentric weights of cam 280, key 282, bearing 288 and pinion gear 292. Rotation of pinion gear 292 is prevented by a circular row of stationary pins 294 extending from plate 296 secured to motor bell housing 30. Preferably, bushings 300, made of hardened steel or other suitable material, are rotatably disposed about pins 294. Pins 294 and bushings 300 extend into apertures 298 formed through pinion gear 292. Each aperture 298 has diameter equal to the diameter of bushing 300 plus twice the eccentricity of pinion gear 292. Subject to manufacturing tolerances, this provides contact between bushing 300 and respective apertures 298 all of the time as pinion 292 oscillates.

The center of the circle of stationary pins 294 is concentric with axis of rotation 258a. The center of the circle of aperturess 298 is at the center of pinion gear 292, which is offset from axis of rotation 258a by the amount of the eccentricity. When pinion gear 292 is oscillated by the action of cam 280 being rotated by shaft 29, the center of pinion gear 292 revolves about axis of rotation 258a, thereby oscillating pinion gear 292 without angularly rotating pinion gear 292.

A plurality of teeth 302 are disposed about the outer diameter of pinion gear 292. The general shape of teeth 302 are cycloidal, although it is well known in the art to use teeth of various shapes. Teeth 302 intermesh with a plurality of pins 267 with busings 269 disposed thereabout. Bushings 267 are preferably made of hardened steel or other suitable material. Pins 267 extend from flange 265 and are disposed in a circle which is concentric with axis of rotation 258a. Pins 267 and bushing 269 act as a ring gear by the oscillation of pinion gear 292. Alternatively, pins 267 and bushings 269 may be replaced by complementarily shaped internal teeth. There is at least one less tooth 302 than pins 267.

Planocentric drive mechanism 284 is lubricated with grease or other suitable lubricant. Axial flange portion 265a surrounds pinion gear 292, teeth 302 and pins 267 as shown and acts to retain the lubricant in this area.

The oscillation of pinion gear 292 and resulting meshing action between teeth 302 and pins 267 cause pins 267 to advance rotationally by one tooth of pinion gear 292 for each rotation of shaft 29. This in turn rotates crank 254 by an angular distance equal to the angular spacing of pins 267 for each rotation of shaft 29. The reduction ratio is determined by the difference between the number of pins 267 and teeth 302 divided into the number of pins 267. In the preferred embodiment, there are 13 pins 267 and 12 teeth 302, yielding a reduction ration of 13:1. Thirteen rotations of shaft 29 are required to cause one rotation of output shaft 254a, causing one full eccentric rotation of crank 254.

Figure 16:
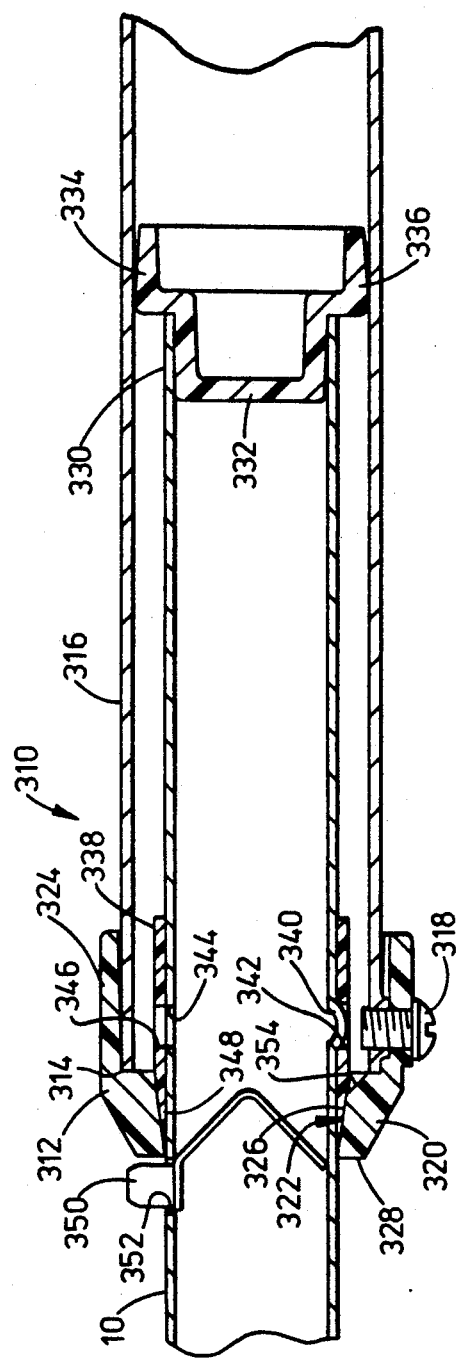
FIG. 16 is a fragmentary cross-sectional view of the telescoping handle locking mechanism.

Referring to FIG. 16, there is shown locking mechanism 310 which is used on each of legs 10 and 12 to secure telescoping handle 8 in the extended position without rocking or wobble. Locking mechanism 310 includes end cap 312 secured to tube 316 at end 314 by threaded fastener 318. Other means of securing end cap 312 to tube 316 may be used. End cap 312 includes body portion 320 with centrally disposed aperture 322. Mounting flange 324 extends from body 320 and is disposed about the outside diameter of tube 316 as shown. Preferably, the radial clearance between the inside diameter of mounting flange 324 and the outside diameter of tube 316 is minimized so as to reduce or eliminate radial play between the two components. Aperture 322 includes frustoconical wall 326, which has its smallest diameter adjacent end 328 of end cap 312.

Although only leg 10 is shown in FIG. 16, it will be understood that locking mechanism 310 is also used on leg 12, as well as may be used on any similar telescoping device. Leg 10 has a smaller diameter than tube 316. The outside diameter of leg 10 is slightly smaller than the diameter of frustoconical wall 326 at end 328, being enough smaller to allow leg 10 to slide through aperture 332 even when paint has accumulated on leg 10. At distal end 330 of leg 10, piloting plug 332 is securely fastened by any conventional means, such as crimping end 330 onto plug 332. Plug 332 includes piloting portion 334 which has pilot diameter 336 that is slightly smaller than the inside diameter of tube 316, thereby allowing relatively free axial movement of .plug 332 and leg 10 through the inside of tube 316 while minimizing the radial play therebetween. Piloting portion 334 may be relieved at a point about its diameter as is necessary to provide clearance for any protrusions which may extend from the inside diameter of tube 316. Such may be accomplished by cutting a small flat across or axial groove through piloting portion 334. Such a relief also provides a convenient path for air captured within the interior of tube 316 to flow around piloting plug 332.

Disposed about the outside diameter of leg 10 and axially spaced from distal end 330 is sleeve 338. Sleeve 338 is secured to leg 10 by dimple 340 formed in leg 10 and extending outwardly into aperture 342 formed through sleeve 338. Diametrically opposite dimple 340 and aperture 342 is aperture 344 formed through leg 10 and aperture 346 formed through sleeve 338. Apertures 344 and 346 provide access to the interior of leg 10 to allow the formation of dimple 340 radially outward as shown. Sleeve 338 includes frustoconical wall 348 formed at one end of sleeve 338 and shaped complimentary to frustoconical wall 326.

Spring button assembly 350 is disposed through aperture 352 formed through leg 10 adjacent frustoconical wall 348 of sleeve 338. Aperture 352 is axially spaced from sleeve 338 a distance which is sufficient to allow spring button assembly 350 to fully extend as shown in FIG. 16 while minimizing axial end play between spring button 350 and end 328 so as to keep frustoconical wall 348 in close proximity to frustoconical wall 326, thereby minimizing radial play therebetween.

As shown in FIG. 16, locking mechanism 310 stabilizes leg 10 which extends from the interior of leg 316 by the mating of frustoconical wall 326 with frustoconical wall 348 in conjunction with axially spaced apart piloting diameter 336 of plug 332 at distal end 330. The piloting fit between sleeve 330 and end cap 312 and between piloting plug 332 and the inside diameter of tube 316 minimizes wobble in leg 10, particularly at locations spaced away from locking mechanism 310. The space between sleeve 338 and piloting plug 332 is determined by the length of leg 10 which will extend past end cap 312 in an unsupported manner and on the amount of force or bending moment expected to be exerted on leg 10.

To slide leg 10 into tube 316, spring button assembly 350 is depressed to allow it to slide through aperture 322. Leg 10 may then be stored within tube 316 as is well known with telescoping legs. To extend leg 10 from tube 316, leg 10 is simply pulled out of tube 316, with button assembly 350 encountering chamfer 354 at the base of frustoconical wall 316, both of which operate to depress spring button assembly 350 as leg 10 is withdrawn from tube 316.

Figure 17:
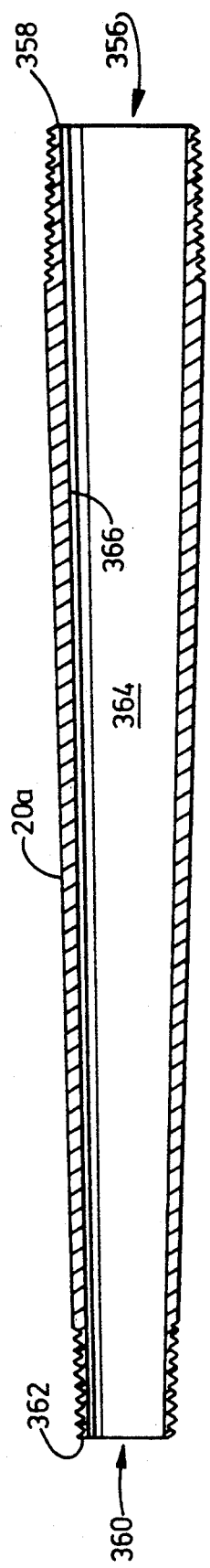
FIG. 17 is a cross-sectional view of an alternative embodiment of the present invention showing a tapered siphon intake tube.

Referring now to FIG. 17, there is shown an alternate embodiment of siphon tube 20. Siphon tube 20a includes lower inlet 356 at end 358. End 358 is threaded about its periphery so that screen 22 may be threadedly secured thereto. Upper outlet 360 is located at opposite end 362. End 362 includes threads about its periphery which allows tube 20a to be threaded to foot valve assembly 64 by engaging threads 72, thereby placing upper outlet 360 in fluid communication with inlet 46.

The interior of siphon tube 20a defines fluid passageway 364 which is in fluid communication with inlet 356 and outlet 360. The cross-sectional shape of tube 20a across its longitudinal axis is generally circular and has an internal diameter of at least 0.5 inches, with inlet 356 having a larger cross-sectional area than outlet 360. In the preferred embodiment, the diameter of outlet 360 is approximately 0.51 inches, while the diameter of inlet 356 is approximately 0.83 inches, producing an inlet to outlet area ratio of 2.64.

Interior wall 366 of tube 20a has a frustoconical shape, tapering from the larger diameter at inlet 356 to the smaller diameter at outlet 360 at about 1°, although other taper angles are acceptable. It is believed that the shape of fluid passageway 364 reduces turbulence in the flow of liquid therethrough, promoting laminar flow, thereby reducing flow losses and allowing fluid pump 42 to operate more efficiently. The tapered shape allows fluid pump 42 to be primed easier.

In the preferred embodiment, interior wall 366 of tube 20a has a frustoconical shape, tapering from the larger diameter at inlet 356 to the smaller diameter at outlet 360. The angle of wall 366 is at about 1°, although other taper angles are acceptable. It is believed that the frustoconical shape of fluid passageway 364, and inlet 356 being larger than outlet 360 reduces turbulence in the flow of liquid therethrough, promoting laminar flow, thereby reducing flow losses and allowing fluid pump 42 to operate more efficiently. The tapered shape allows fluid pump 42 to be primed easier.

In summary, numerous benefits have been described which result from applying the concepts of the invention. The fluid pump assembly provides a fluid pump which has internal outlet passages oriented at an angle to the axis of reciprocation which improve efficiency and decreases the length. Reversible valve seats are included to extend the useable life of the seats. The valve seats include concaved sealing surfaces. Stationary upper and lower packing glands are utilized which may be adjusted externally to urge compressingly the packing glands into sealing engagement with the piston and the cylinder. A two-piece piston assembly replaceable wear sleeves is incorporated which improves manufacturability and serviceability. The side forces generated by the mechanism used to translate rotational power to reciprocating motion are minimized through the use of a guide post, spaced apart colinear bushings and an open side scotch yoke mechanism. The overall length and complexity of the fluid pump assembly transmission are minimized through the incorporation of a planocentric drive speed reducer.

The foregoing description of the preferred embodiments of the invention have been presented for purposes of illustration and description. It is not intended to be exhaustive nor to limit the invention to the precise form disclosed. Obvious modifications or variations are possible in light of the above teachings. The embodiments were chosen and described in order to best illustrate the principals of the invention and its practical applications to thereby enable one of ordinary skill in the art to best utilize the invention in various embodiments and with various modifications as suited to the particular use contemplated. It is intended that the scope of the invention be defined by the claims appended hereto.

We claim:

1. A planocentric drive mechanism, comprising:
   (a) a rotating shaft having an axis of rotation;
   (b) a plurality of first pins disposed equally circumferentially spaced in a circle, said circle being centered about said axis of rotation, said pins being stationary with respect to first rotating shaft, said pins also being spaced radially apart from said rotating shaft;
   (c) an eccentric cam carried by said rotating shaft and disposed to rotate eccentrically about said axis of rotation, said cam being non-rotatable with respect to said rotating shaft;
   (d) a pinion gear rotatably carried by said eccentric cam, said pinion gear including:
      (i) a plurality of apertures formed through said pinion gear, each of said apertures having a respective one of said first pins disposed at least partially therein; and
      (ii) a plurality of cycloidal teeth disposed about the periphery of said pinion gear; and
   (e) an output shaft rotatably supported by said rotating shaft, said output shaft being concentric with and rotatable about said axis of rotation, said output shaft including a plurality of second pins extending from said output shaft, said second pins being disposed equally circumferentially spaced in a circle, said circle being centered about said axis of rotation, the number of said second pins being at least one more than the number of said cycloidal teeth, said second pins meshing with said cycloidal teeth.

2. A drive mechanism, comprising:
   (a) a rotating shaft having an axis of rotation;
   (b) a plurality of first pins disposed equally circumferentially spaced in a circle, said circle being centered about said axis of rotation, said pins being stationary with respect to rotating shaft, said pins also being spaced radially apart from said rotating shaft;
   (c) an eccentric cam carried by said rotating shaft and disposed to rotate eccentrically about said axis of rotation, said cam being non-rotatable with respect to said rotating shaft;
   (d) a pinion gear rotatably carried by said eccentric cam, said pinion gear including:
      (i) a plurality of apertures formed through said pinion gear, each of said apertures having a respective one of said first pins disposed at least partially therein; and
      (ii) a plurality of cycloidal teeth disposed about the periphery of said pinion gear;
   (e) an output shaft rotatably supported by said rotating shaft, said output shaft being concentric with and rotatable about said axis of rotation, said output shaft including a plurality of second pins extending from said output shaft, said second pins being disposed equally circumferentially spaced in a circle, said circle being centered about said axis of rotation, the numbered of said second pins being at least one more than the number of said cycloidal teeth, said second pins meshing with said cycloidal teeth;

(f) a second eccentric cam formed integrally with said output shaft intermediate the two ends of said output shaft, said second eccentric cam being disposed to rotate eccentrically about said axis of rotation; and (g) a yoke having an axis of reciprocation, said yoke having first and second surfaces disposed substantially perpendicular to said axis of reciprocation in a spaced apart relation from each other, said first and second surfaces defining an open side recess therebetween, said open side recess having a thickness less than the thickness of said yoke, said open side recess being configured to receive said second eccentric cam, said second eccentric cam being disposed at least partially in said recess, said yoke also including a slot formed through said yoke parallel to said axis of reciprocation and in communication with said open side recess, said shaft being disposed through said slot.

* * * * *